US006227977B1

(12) United States Patent
Tanaka et al.

(10) Patent No.: US 6,227,977 B1
(45) Date of Patent: May 8, 2001

(54) BUSHING FOR A DAMPENING MECHANISM

(75) Inventors: Masanobu Tanaka, Hirakata; Hideki Hashimoto, Katano; Takashi Harada, Shijonawate, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/325,740

(22) Filed: Jun. 4, 1999

(30) Foreign Application Priority Data

Jun. 16, 1998 (JP) .................................................. 10-168192

(51) Int. Cl.[7] ....................................................... F16D 3/66
(52) U.S. Cl. ............................................... 464/68; 192/204
(58) Field of Search ........................ 192/213.12, 213.22, 192/204; 464/68

(56) References Cited

U.S. PATENT DOCUMENTS

| | | | |
|---|---|---|---|
| 4,537,296 | * | 8/1985 | Lech, Jr. et al. ..................... 464/68 X |
| 4,560,054 | | 12/1985 | Kayanoki et al. . |
| 4,577,742 | | 3/1986 | Saida . |
| 4,585,428 | | 4/1986 | Asada . |
| 4,586,595 | | 5/1986 | Hartig et al. . |
| 4,643,288 | | 2/1987 | Tomm et al. . |
| 4,669,595 | | 6/1987 | Fischer et al. . |
| 4,684,007 | | 8/1987 | Maucher . |
| 4,890,712 | * | 1/1990 | Maucher et al. ..................... 464/68 X |
| 4,966,269 | | 10/1990 | Raab et al. . |
| 4,998,608 | | 3/1991 | Raab et al. . |
| 5,020,425 | * | 6/1991 | Kelly . |
| 5,209,334 | * | 5/1993 | Fisher et al. ........................ 464/68 X |
| 5,238,096 | | 8/1993 | Ament et al. . |
| 5,246,398 | | 9/1993 | Birk et al. . |
| 5,251,736 | * | 10/1993 | Jeppe et al. ......................... 464/68 X |
| 5,370,581 | * | 12/1994 | Rohrle et al. ........................... 464/68 |
| 5,667,442 | * | 9/1997 | Tanaka ................................... 464/49 |
| 5,685,783 | * | 11/1997 | Akatsuka et al. . |
| 5,771,999 | * | 6/1998 | Kleifges et al. .................... 464/68 X |
| 5,893,446 | | 4/1999 | Honjo et al. . |
| 5,961,155 | * | 10/1999 | Youngs ............................. 277/634 X |
| 6,056,103 | * | 5/2000 | Hashimoto et al. ............. 192/213.12 |
| 6,073,937 | * | 6/2000 | Stevens et al. ....................... 277/653 |

* cited by examiner

*Primary Examiner*—Lynne H. Browne
*Assistant Examiner*—Greg Binda
(74) *Attorney, Agent, or Firm*—Shinjyu Global IP Counselors, LLP

(57) ABSTRACT

A torque can be transmitted by a bushing 101 located between a pair of torque transmitting members. The bushing 101 is constructed out of resin and metal such that the part made of resin does not significantly contact the torque transmitting members. The bushing 101 includes an annular portion 102 made of resin and a connecting portion 103 made of metal. The connecting portion 103 is molded in an annular portion 102. The connecting portion 103 has parts (117 and 118), which are connected with the torque transmitting members so as to be able to transmit a torque therebetween. In a preferred embodiment, the bushing 101 is part of a dampening mechanism 6, which generates a friction between a hub flange 18 and a hub 3 when both of the portions rotate relatively. The bushing 101 supports a plurality of springs 21 to elastically couple a fixing plate 20 of the hub flange 18 to the hub 3. The bushing 101 rotates with the hub 3, while the fixing plate 20 rotates with the hub flange 18. The fixing plate 20 includes a first disk-shaped part 71 and a second disk-shaped plate 73. The second disk-shaped plate 73 engages bushing 101 to generate a friction therebetween when the hub 3 and the hub flange 18 rotate relative to each other.

19 Claims, 22 Drawing Sheets

BUSHING FOR A DAMPENING MECHANISM

BACKGROUND OF THE INVENTION

1. Field of the Invention

This invention generally relates to a bushing. More specifically, the present invention relates to a resin bushing used for a dampening mechanism.

2. Background Information

A clutch disk assembly or dampening disk assembly used for a clutch of a car has a clutch function of coupling and/or uncoupling a flywheel of the engine to the transmission shaft, and a dampening function of absorbing and dampening torsion vibrations transmitted from the flywheel. The clutch disk assembly basically includes a clutch disk, a pair of input plates, a hub and an elastic portion. The pair of input plates is fixedly coupled to the clutch disk. The hub is disposed on the inner circumferential side of the input plate. The elastic portion elastically couples the hub and the input plates together for movement in a rotary direction. The elastic portion is disposed between the input plates and the hub, and is compressed in a rotary direction when the input plate rotates relatively against the hub. When the clutch disk assembly is coupled with the flywheel, a torque is inputted to the input plates of the clutch disk assembly from the flywheel. The torque is transmitted to the hub via the elastic portion, and then is outputted to a shaft extending from a transmission. When a torque fluctuation is input to the clutch disk assembly from an engine, a relative rotation is caused between the pair of input plates and the hub, and the elastic portion is compressed repeatedly in a circular direction.

In addition, the clutch disk assembly typically includes a friction mechanism. The friction mechanism is disposed between the input plates and the hub, and generates a friction resistance when the input plates rotate relatively against the hub. The friction mechanism includes basically a plurality of washers and urging portions.

A clutch disk assembly of a separated hub type has a hub flange (separated flange) in which a conventional flange of the hub is separated from a boss. In addition, in the clutch disk assembly of a separated hub type, the boss and the hub flange are coupled in a rotary direction by an elastic portion with a low rigidity. The clutch disk assembly has a wide torsion angle between the input plate and the hub, and shows a two step rigidity (low rigidity and high rigidity).

The conventional clutch disk assembly of a separated hub type described above includes, for example, a small friction mechanism between a retaining plate (one of a pair of input plates) and the boss of the hub, and a large friction mechanism between the retaining plate and the hub flange. The large friction mechanism includes a first friction portion and a first urging portion. The first friction portion touches the hub flange, and is also connected with the retaining plate in a relatively non-rotatably and axially movably manner. The first urging portion is disposed between the first friction portion and the retaining plate, and urges the first friction portion toward the hub flange side. The small friction mechanism includes a second friction portion and a second urging portion. The second friction portion touches the flange of the hub and is also connected with the retaining plate in a relatively non-rotatably and axially movably manner. The second urging portion is disposed between the second friction portion and the retaining plate, and urges the second friction portion toward the flange side. Generally, the first friction portion is set to have a friction coefficient larger than that of the second friction portion. The first urging portion is set to have an urging force larger than that of the second urging portion. Consequently, the large friction mechanism generates a friction (high hysteresis torque) larger than that of the small friction mechanism.

When the hub flange rotates relatively against the hub within a range of a torsion angle of a first step, an elastic portion with a low rigidity is compressed, and the second friction portion of the small friction mechanism rubs the flange of the boss, resulting in characteristics of low rigidity and low hysteresis torque. After the hub flange starts rotating together with the boss in a body, a relative rotation is caused between the hub flange and the pair of input plates. Within the range of this second step, the elastic portion with a high rigidity is compressed between the hub flange and a pair of input plates, and the second friction portion of the large friction mechanism rubs the hub flange, resulting in a characteristic of a high rigidity and high hysteresis torque.

A bushing made of, for example, resin is used for a dampening mechanism of a clutch disk assembly. The bushing made of a resin material can have a complicated shape easily by means of molding. Some resin bushings have a friction face to rub other portions in a rotary direction. Some bushings are connected with other portions in a rotary direction elastically via spring. In that case, the bushing has a concave part to seat the spring in, and a touching face to support both ends of the spring in a circular direction is formed at both ends of the concave part in a circular direction.

In addition, some bushings have a connecting part projecting in an axial direction in order to be connected with other portions relatively non-rotatably.

In the conventional resin bushing mentioned above, a part connected with other portions, for example, a part to support the spring and a part connected with other portions relatively non-rotatably, is easily abraded. When an abrasion progresses, a gap is caused between the bushing and other portions, resulting in unfavorable torsion characteristics.

In view of the above, there exists a need for a resin bushing which overcomes the above-mentioned problems in the prior art. This invention addresses this need in the prior art as well as other needs, which will become apparent to those skilled in the art from this disclosure.

SUMMARY OF THE INVENTION

An object of the present invention is to prevent abrasion of a resin bushing.

One aspect of the present invention includes a bushing that can transmit a torque to other portions. The bushing includes an annular resin portion and a connecting portion. The connecting portion is molded in the annular portion and is connected with other portions. The connecting portion is more resistant against abrasion than the annular portion. That the connecting portion is connected with other portions means a connection to be able to transmit a torque in a rotary direction, or a connection to be unmovable in an axial direction. The connecting portion which is more resistant against abrasion than the annular portion is connected with other portions, resulting in less abrasion.

Another aspect of the present invention includes a bushing of the first mentioned aspect with a connecting portion that includes an annular part fit in the annular portion, and a connecting part extending from the annular part and projecting from the annular portion in order to be connected with other portions. The connecting part is connected with other portions, preventing its abrasion from progressing.

Another aspect of the present invention includes a bushing of the first mentioned aspect in which the annular portion has a spring receptacle to seat in a spring. The connecting portion includes an annular part fit in the annular portion, and a supporting part extending from the annular part, disposed at both ends of the spring receptacle in a circular direction, and being able to touch the spring.

Since a supporting part made of, for example, metal is disposed at both ends of the spring receptacle in a circular direction, both ends of the spring in a circular direction are supported by the supporting part, resulting in less abrasion of a part to support the spring.

Another aspect of the present invention includes a bushing of the first mentioned aspect in which the bushing unitarily rotates together with a first portion and is connected with a second portion in a rotary direction via a spring. The bushing includes an annular resin portion and a connecting portion. The connecting portion has a spring receptacle in which to seat the spring. The connecting portion includes an annular part molded in the annular portion, a connecting part extending from the annular part and disposed at both ends of the spring receptacle in a circular direction. The connecting portion is more resistant against abrasion than the annular portion. The connecting part connected with the first portion and the supporting part to support the spring are formed from the annular portion which has a high abrasion resistance, resulting in less abrasion of each portion.

Another aspect of the present invention includes a bushing of any of the previously mentioned aspects in which an annular portion has a friction face to generate a hysteresis torque by rotating relatively.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
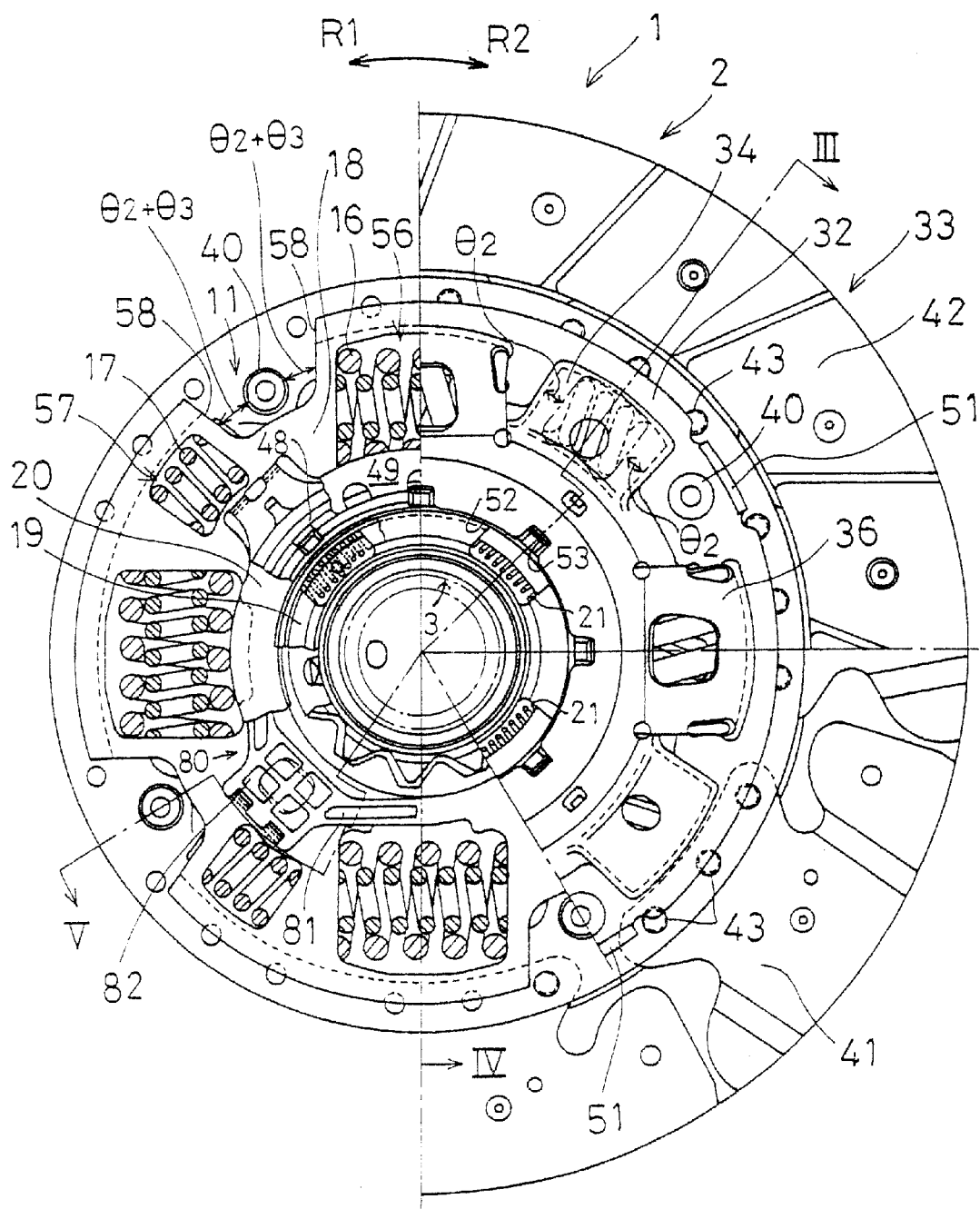
FIG. 1 is a partial side elevational view of a clutch disk assembly in accordance with an embodiment of the present invention with portions broken away for purposes of illustration.
Figure 2:
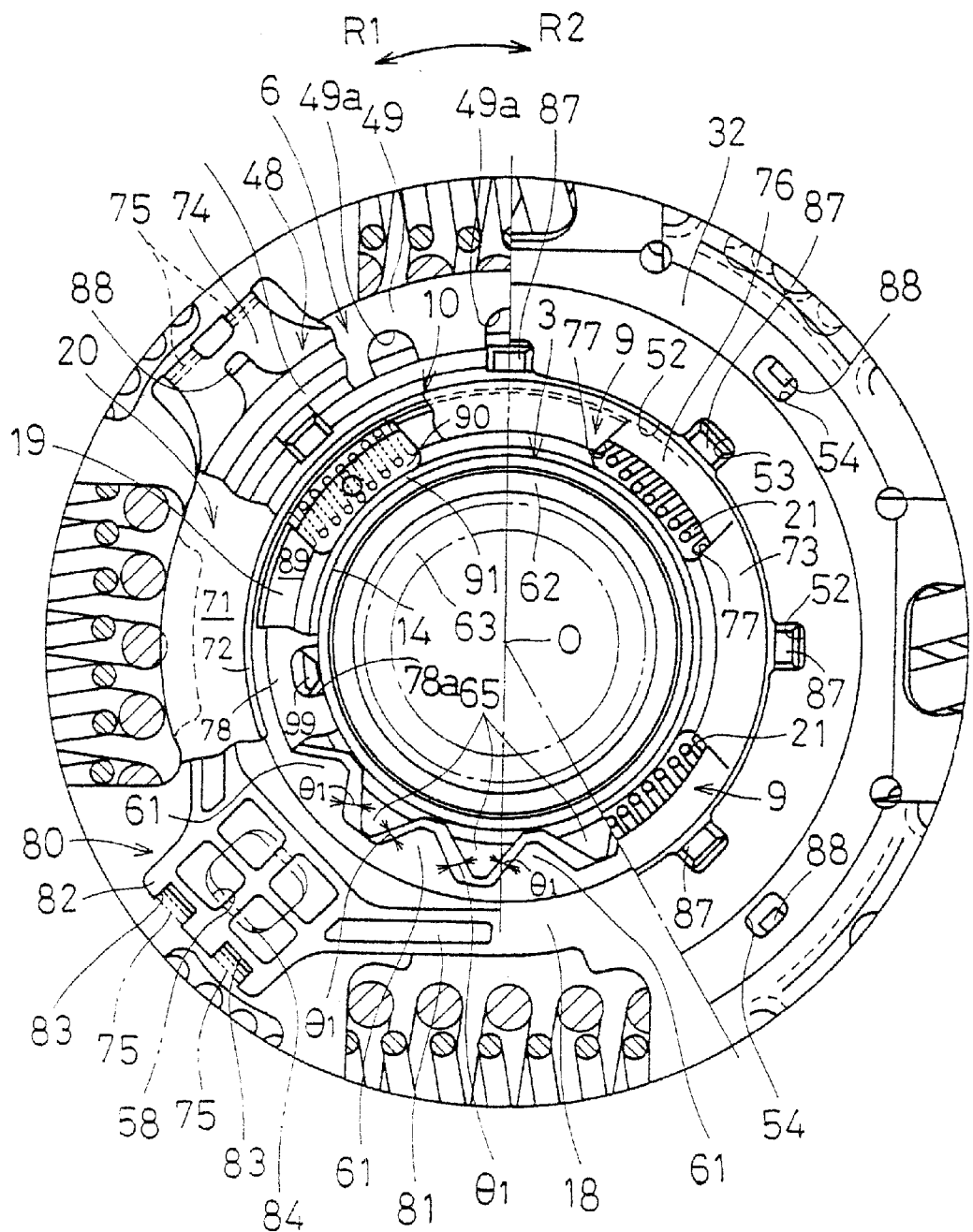
FIG. 2 is an enlarged partial side elevational view of a part of the clutch disk assembly illustrated in FIG. 1 with portions broken away for purposes of illustration.
Figure 3:
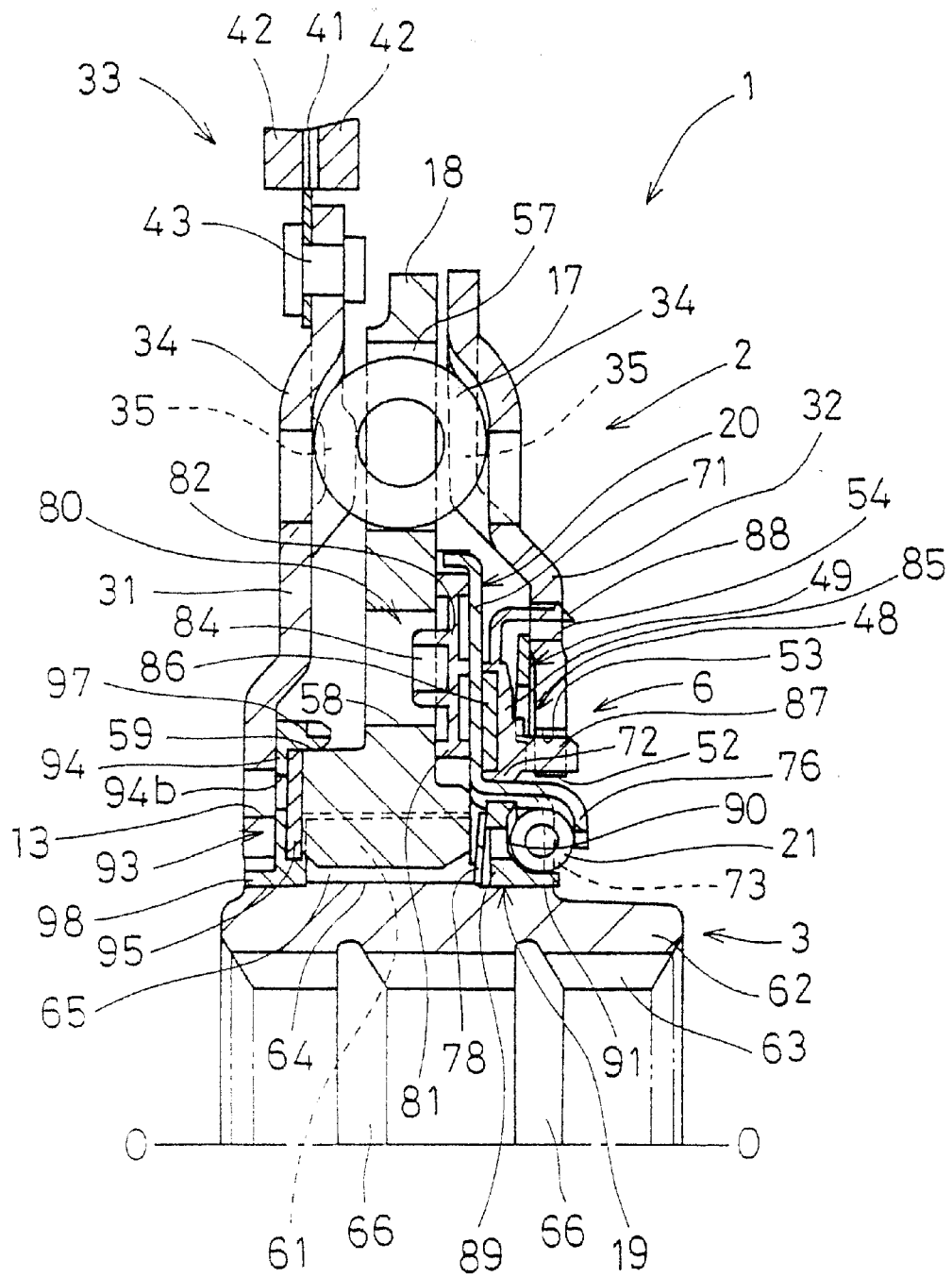
FIG. 3 is an enlarged partial cross sectional view of a part of the clutch disk assembly illustrated in FIG. 1 as viewed along section line O-III of FIG. 1.
Figure 4:
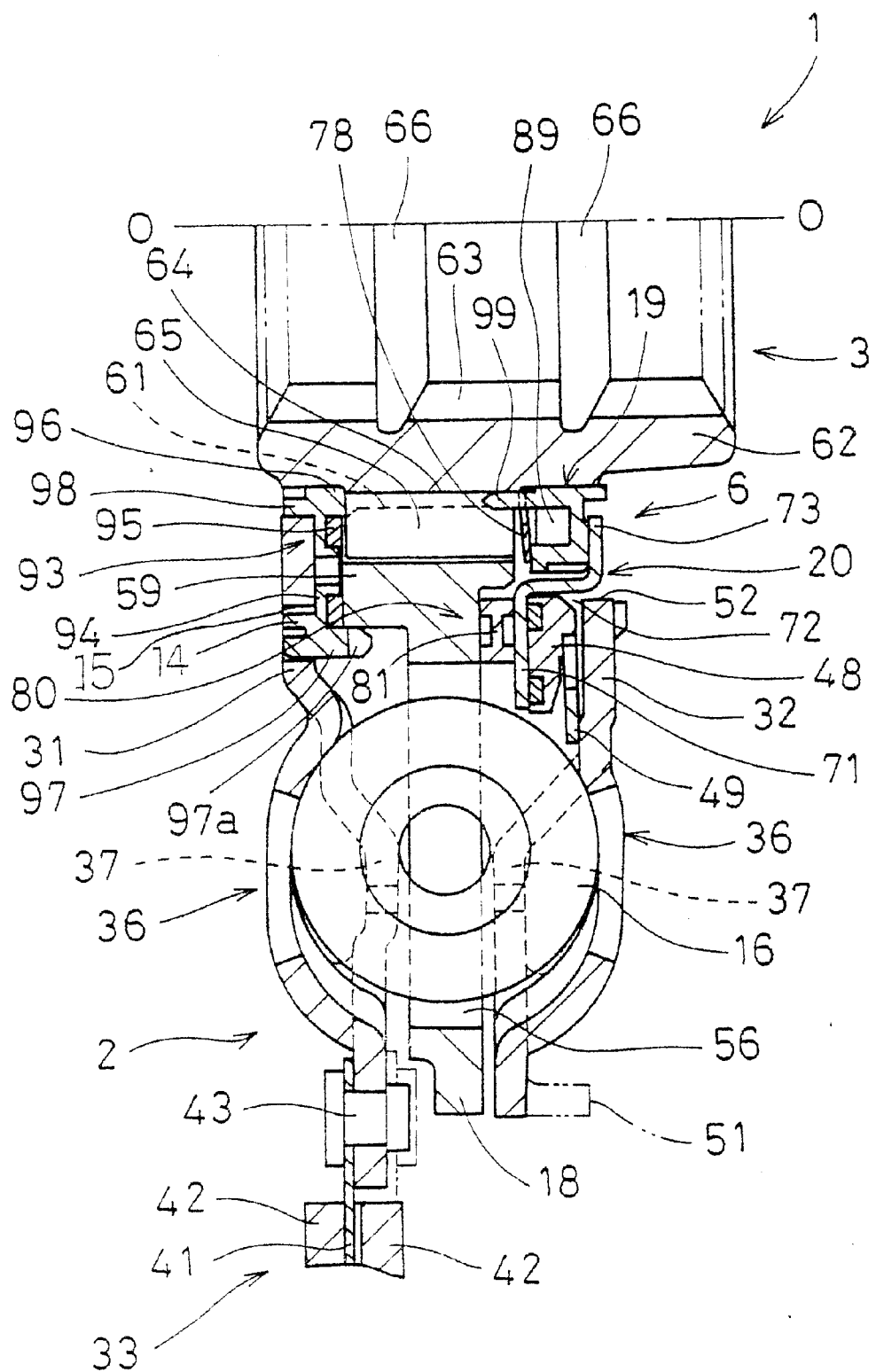
FIG. 4 is an enlarged partial cross sectional view of a part of the clutch disk assembly illustrated in FIG. 1 as viewed along section line O-IV of FIG. 1.
Figure 5:
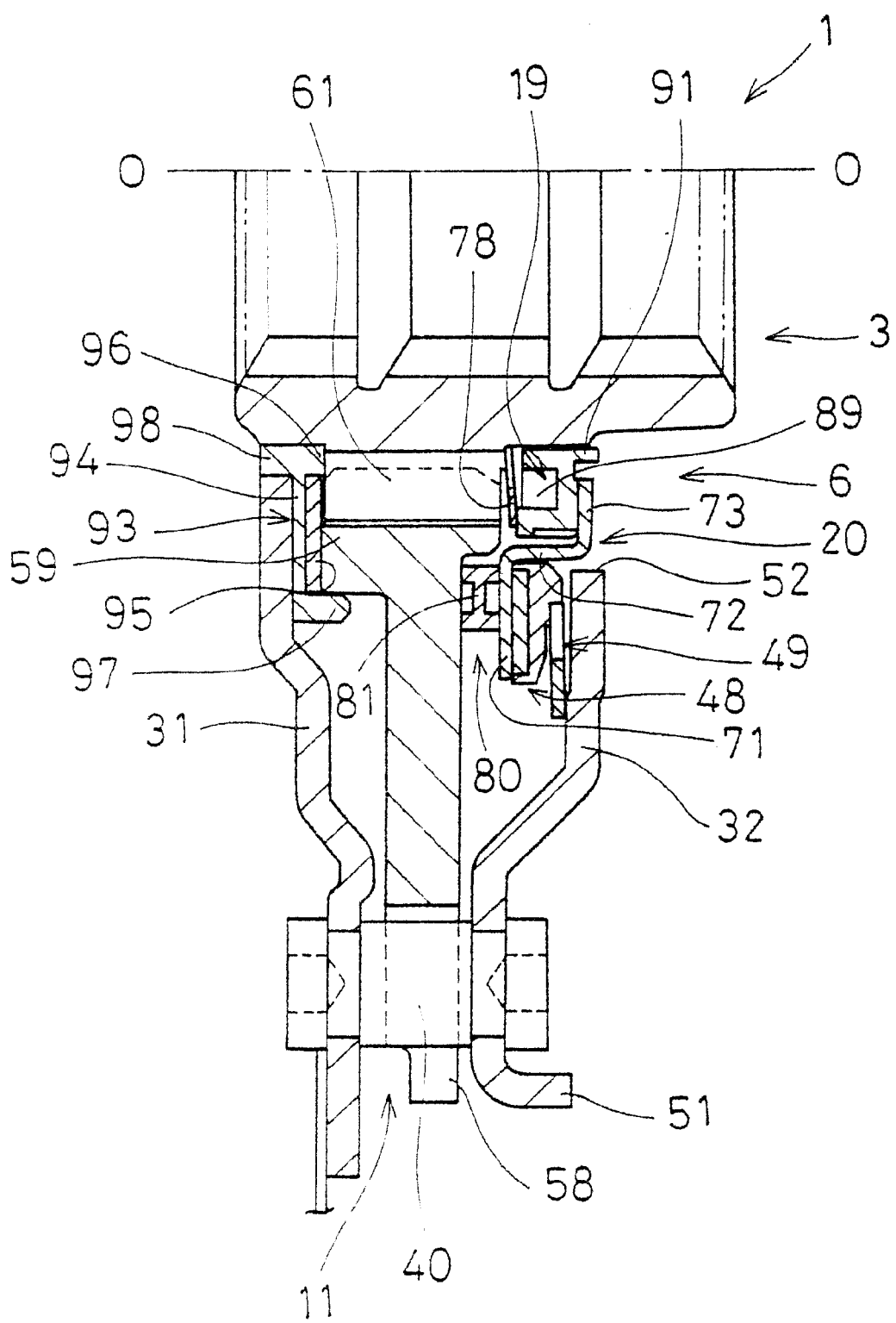
FIG. 5 is an enlarged partial cross sectional view of a part of the clutch disk assembly illustrated in FIG. 1 as viewed along section line O-V of FIG. 1.

Referring initially to FIGS. 1 to 5, a clutch disk assembly 1 is illustrated in accordance with a first embodiment of the present invention. The clutch disk assembly 1 is used for a clutch of a car or other motorized vehicle. On the left side of the clutch disk assembly as viewed in FIGS. 3 to 5, an engine and a flywheel (not shown in Figures) are located, and on the right side as viewed in FIGS. 3 to 5, a transmission (not shown in Figures) is located. Hereafter, the left side as viewed in FIGS. 3 to 5 is referred as a first axis side (engine side), and the right side as viewed in FIGS. 3 to 5 is referred as a second axis side (transmission side). The centerline O—O in each of the drawings represents an axis of rotation or a center of rotation of the clutch disk assembly 1. As shown in FIGS. 1 and 2, an arrow R1 indicates a first rotational direction (positive direction) of the flywheel and the clutch disk assembly 1, while an arrow R2 indicates its opposite rotational direction (negative direction).

Figure 6:
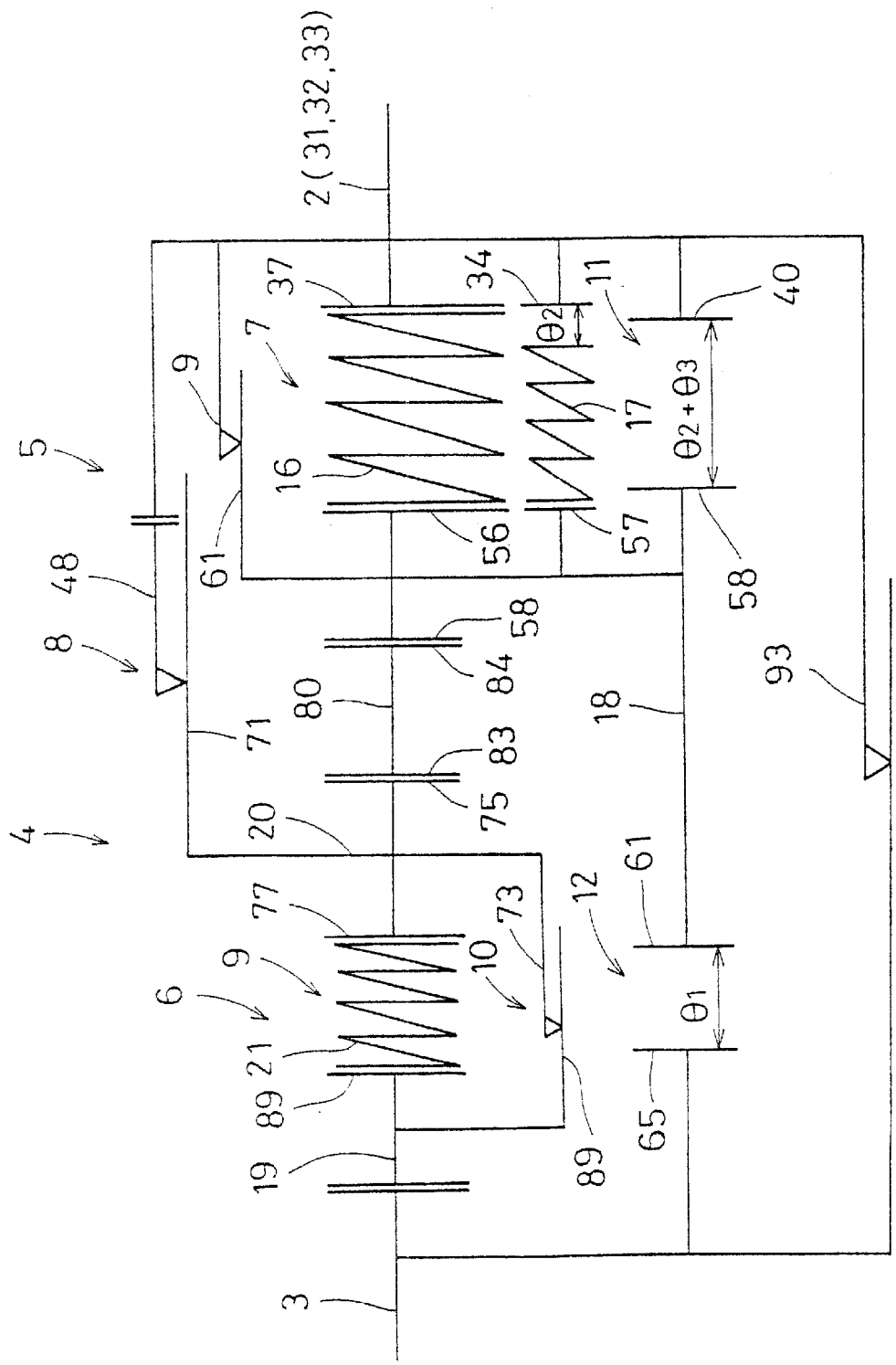
FIG. 6 is a diagrammatic machine circuit drawing of a dampening mechanism utilizing the clutch disk assembly in accordance with the present invention.

A clutch disk assembly 1, as shown in a machine circuit diagram of FIG. 6, mainly includes an input rotary portion 2, a hub or output rotary portion 3, and a dampening mechanism 4 disposed between the input rotary portion 2 and the hub 3. The dampening mechanism 4 includes a first dampening mechanism 5 with a characteristic of a torsion angle of a second step, and a second dampening mechanism 6 with a characteristic of a torsion angle of a first step. The dampening mechanism 4 also has a third dampening mechanism, discussed below, with a friction mechanism that operates throughout the range of the steps of torsion. The first dampening mechanism 5 and the second dampening mechanism 6 are disposed between the input rotary portion 2 and hub 3 so as to operate in series via a hub flange or intermediate plate 18. The third dampening mechanism is also disposed between the input rotary portion 2 and output hub 3.

Still referring to FIG. 6, the first dampening mechanism 5 basically includes a first elastic mechanism 7, a first friction mechanism 8 and a first stopper 11. The first elastic mechanism 7 has two sets of springs 16 and 17 as seen in FIG. 1. The first friction mechanism 8 generates friction when the hub flange 18 rotates relatively against the input rotary portion 2. The first stopper 11 is a mechanism that controls a relative turning angle between the hub flange 18 and the input rotary portion 2. The first stopper 11 allows the input rotary portion 2 and the hub flange 18 to rotate relatively to each other within a range of a torsion angle of $\theta_2+\theta_3$. The first elastic mechanism 7 (springs 16 and 17), the first friction mechanism 8 and the first stopper 11 are disposed between the hub flange 18 and the input rotary portion 2 so as to operate in parallel.

The second dampening mechanism 6 includes mainly a second elastic mechanism 9, a second friction mechanism 10 and a second stopper 12. The second elastic mechanism 9 is formed of a plurality of second springs 21. Each second spring 21 of the second elastic mechanism 9 has a spring constant, which is set to be smaller than each of the first springs 16 of the first elastic mechanism 7. The second friction mechanism 10 is set so as to generate a friction smaller than the friction generated by the first friction mechanism 8. The second stopper 12 is a mechanism to control a relative rotation between the hub 3 and the hub flange 18 and permits the hub 3 and the hub flange 18 to rotate relatively within a range of a torsion angle $\theta_1$. The second elastic mechanism 9, the second friction mechanism 10 and the second stopper 12 are disposed between the hub 3 and the hub flange 18 so as to operate in parallel.

The structure of the clutch disk assembly 1 will now be described in more detail with reference to FIG. 3. The input rotary portion 2 includes a clutch plate 31, a retaining plate 32 and a clutch disk 33. The clutch plate 31 and the retaining plate 32 are disk-shaped members which form annular plate portions that are disposed in an axial direction apart from each other by a predetermined distance. The clutch plate 31 is disposed on the first axis side, and the retaining plate 32 is disposed on the second axis side. The outer circumferential parts of the clutch plate 31 and the retaining plate 32 are fixedly coupled to each other by a plurality of stop pins 40 disposed in a circular direction side by side as seen in FIGS. 1 and 5. Consequently, the distance in an axial direction between the clutch plate 31 and the retaining plate 32 is determined by pins 40. Both plates 31 and 32 rotate together in a body. A cushioning plate 41 of the clutch disk 33 is fixedly coupled to the outer circumferential part of the clutch plate 31 by a plurality of rivets 43 as seen in FIGS. 1, 3 and 4. An annular friction facing 42 is fixedly coupled to both sides of the cushioning plate 41.

As seen in FIG. 3, several first receptacles 34 are formed in each of the clutch plate 31 and the retaining plate 32 in equal intervals in a circular direction. The first receptacle 34 is a portion, which swells slightly in an axial direction. Each of the first receptacles 34 has a first supporting portion 35 on its both sides in a circular direction. The first supporting portions 35 oppose each other in a circular direction. As seen in FIG. 4, several second receptacles 36 are formed in each of the clutch plate 31 and the retaining plate 32 in equal intervals in a circular direction. The second receptacles 36 are disposed adjacent to the R1 side of each of the first receptacles 34. Each of the second receptacles 36 has a second supporting portion 37 on its both sides in a circular direction. Each second receptacle 36 is longer than the first receptacle 34 in both a radial and circular directions as seen in FIG. 1.

As seen in FIGS. 4 and 5, at an outer circumferential edge of the retaining plate 32, a plurality of bent parts 51 that are bent toward the second axis side is formed. The bent parts 51 are formed adjacent to the stop pins 40. The bent parts 51 increase the strength of the circumference of the stop pin 40 over the stop pin 40 by itself. Therefore, the stop pins 40 can be disposed at the most radially outer sides of the clutch plate 31 and the retaining plate 32, resulting in a high stopping torque. Since the bent parts 51 do not lengthen the retaining plate 32 in a radial direction, the length of the retaining plate 32 can be smaller in a radial direction compared with that of the conventional one with the same strength. When the length of the retaining plate 32 in a radial direction is the same with that of the conventional one, the stop pins 40 can be disposed at the more radially outer side compared with the conventional one. Since the bent parts 51 are formed partially around the retaining plate 32, the amount of metal plate material is reduced.

As seen in FIGS. 3–5, the hub flange 18 is disposed in an axial direction between the clutch plate 31 and the retaining plate 32. The hub flange 18 operates as an intermediate portion between the input rotary portion 2 and the hub 3. The hub flange 18 is a disk-shaped member or annular portion that is thicker than the plates 31 and 32. At the hub flange 18, several first window holes 57 are formed corresponding to the first receptacles 34. The first window holes 57 are formed for the first receptacles 34. The circular angle of each of the first window holes 57 is smaller than the circular angles between the first supporting portions 35 of the first receptacles 34. The centers of a rotary direction of the first window holes 57 coincide approximately with that of the first receptacles 34. Therefore, as seen in FIG. 1, a gap of a torsion angle $\theta_2$ is formed at both sides in a circular direction between the circular ends of the first window holes 57 and the first supporting portions 35 of the first receptacles 34.

The springs 17 are installed within the first window holes 57. The springs 17 are coil springs with their circular ends touching the circular ends of the first window holes 57. In this condition, gaps with torsion angles $\theta_2$ exist between both circular ends of the springs 17 and the first supporting parts 35 of the first receptacles 34 as seen in FIG. 1.

As seen in FIG. 4, at the hub flange 18, the second window holes 56 are formed at the locations corresponding to the second receptacles 36. The lengths of the second window holes 56 in radial and circular directions coincide approximately with those of the second receptacles 36. The first springs 16 are disposed within the second window holes 56. The first springs 16 form an elastic portion that includes two kinds of coil springs. The circular ends of first springs 16 touch both circular ends of the second window holes 56. In addition, both the circular ends of the first springs 16 touch the second supporting portions 37 of the second receptacle 36.

As seen in FIGS. 3 and 4, a cylinder-shaped portion 59, which extends in axially both directions, is formed at the inner circumferential part of the hub flange 18. The cylinder-shaped portion 59 has a plurality of internal teeth 61 formed thereon as seen in FIG. 2. These internal teeth 61 extend radially inward from the cylinder-shaped portion 59.

The hub 3 is a cylinder-shaped portion, which is disposed at the inner circumferential side of the plates 31 and 32 as well as at the inner circumferential side of the hub flange 18. In other words, the hub 3 is located within a center hole of each of these portions. The hub 3 includes mainly a cylinder-shaped boss 62. The hub 3 has a plurality of splines 63 formed at a center hole of the boss 62. Since the splines 63 are connected with the splines of a shaft extending from the transmission, it is possible to output a torque from the hub 3 to the transmission shaft. A flange 64 extends radially outwardly from the boss 62 of hub 3. In this embodiment, the width of the flange 64 as measured in a radial direction is small. The flange 64 of hub 3 has a plurality of external teeth 65 extending radially outward therefrom. The external teeth 65 can be thought to form a part of the flange 64 that extends radially outwardly from the boss 62. The external teeth 65 have a radial length corresponding to the cylinder-shaped portion 59 of the hub flange 18. The external teeth 65 extend within a space between the internal teeth 61, and gaps with predetermined torsion angles $\theta_1$ are formed in a circular direction at both sides of the external teeth 65. The torsion angle $\theta_1$ on the R2 side of the external teeth 65 is set to be slightly larger than the torsion angle $\theta_1$ on the R1 side. The circular width of either the internal tooth 61 or the external tooth 65 is getting smaller, as it is located closer to the end of the tooth in a radial direction.

Since both the internal teeth 61 and the external teeth 65 are formed along the entire periphery, the areas which both the internal teeth 61 and the external teeth 65 touch each other increase. In other words, being different from the conventional teeth, a cutout in which an elastic portion with a low rigidity is disposed is not formed. As the result, the contact areas between the internal teeth 61 and the external teeth 65 increase. In other words, since a bearing stress between both of these portions decreases, an abrasion or damage of the portions is unlikely to occur. Consequently, the present teeth system has a characteristic of a high torque using a smaller space compared with that in which a part of the teeth are deleted.

The second dampening mechanism 6 will now be described as follows with particular reference being made to FIGS. 3–5 and 8–11. The second dampening mechanism 6 not only transmits a torque between the hub 3 and the hub flange 18, but also absorbs and dampens torsion vibrations. The second elastic mechanism 9 of the second dampening mechanism 6 mainly includes the second springs 21. The second friction mechanism 10 of the second dampening mechanism 6 includes a bushing 19, a fixing plate 20 and a second cone spring 78. The second dampening mechanism 6 is located to be different in an axial direction from the internal teeth 61 and the external teeth 65, which connect the hub 3 and the hub flange 18. In particular, as seen in FIGS. 3–5, the second dampening mechanism 6 is placed so as to be shifted from the internal teeth 61 and the external teeth 65 to the transmission side. In this way, the sufficient contact areas between the internal teeth 61 and the external teeth 65 can be secured. In addition, since the second dampening mechanism 6 is not disposed between the internal teeth 61 and the external teeth 65, the sufficient margin to connect the second springs 21 can be secured, being different from the conventional one. As the result, since a spring sheet is not necessary, the performance to assemble the second springs 21 is improved.

The fixing plate 20 operates as an input portion of the input side in the second dampening mechanism 6. In other words, the fixing plate 20 is a portion to which a torque is inputted from the hub flange 18. The fixing plate 20 is a thin metal plate portion disposed between the inner circumference of the hub flange 18 and the inner circumference of the retaining plate 32. As shown in FIGS. 8 to 11, the fixing plate 20 includes a first disk-shaped portion 71, a cylinder-shaped or tubular portion 72 and the second disk-shaped portion 73. The cylinder-shaped portion 72 extends from the inner circumferential edge of the first disk-shaped portion 71 toward the second axis side (the transmission side). The second disk-shaped portion 73 extends from the cylinder-shaped portion 72 inward in a radial direction.

As seen in FIGS. 2–5, a spacer 80 is disposed between the first disk-shaped portion 71 of the fixing plate 20 and the hub flange 18. The spacer 80 connects the fixing plate 20 with the hub flange 18 in a rotary direction, and plays a role to receive a force which is applied from the fixing plate 20 to the hub flange 18. The spacer 80 is an annular resin portion, and has many lightening portions to decrease the weight. The spacer 80 includes an annular portion 81 and a plurality of protrusions 82 projecting from the annular portion 81 outward in a radial direction as seen in FIG. 2. Two cutouts 83 are formed at the outer circumferential edge of each of the protrusions 82. A projection 84 extends from each of the protrusions 82 toward the first axis side as seen in FIG. 3. Projections 84 are inserted in connecting holes 58, which are formed in the hub flange 18. The projections 84 are connected with the connecting holes 58 such that the projections 84 are slightly movable in a radial direction while being relatively unrotatable with the hub flange 18.

Figure 8:
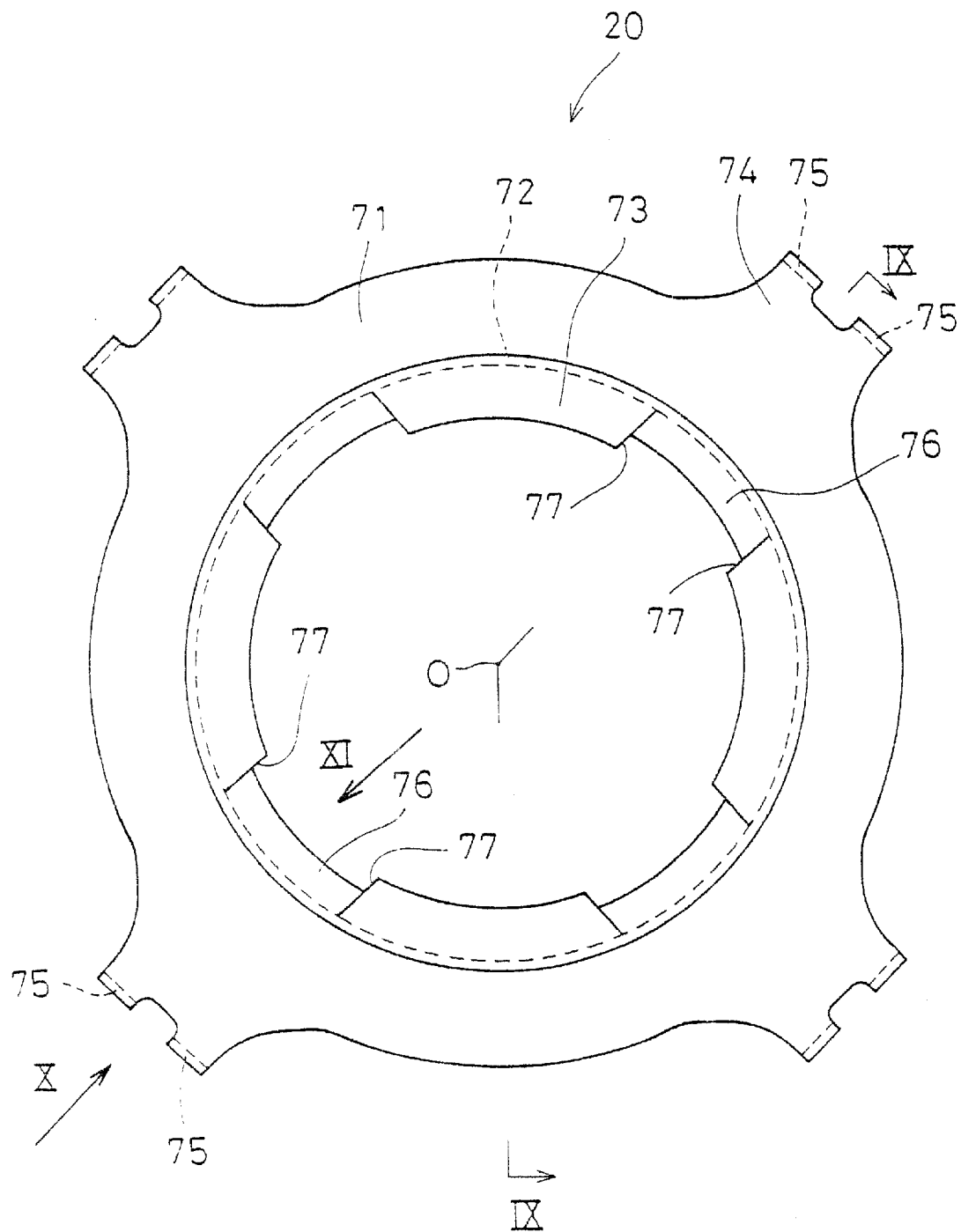
FIG. 8 is a side elevational view of a fixing plate utilized with the clutch disk assembly illustrated in FIG. 1 in accordance with the present invention.
Figure 9:
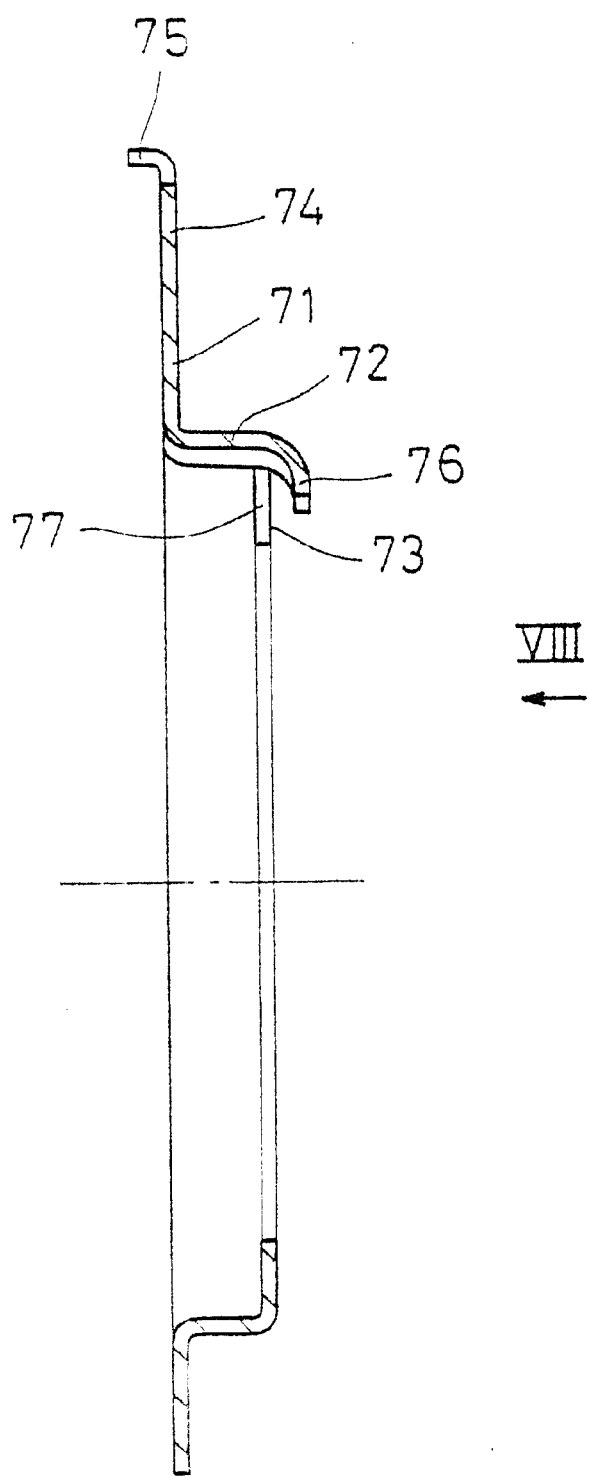
FIG. 9 is a cross sectional view the fixing plate illustrated in FIG. 8 as viewed along section line IX—IX of FIG. 8.
Figure 10:
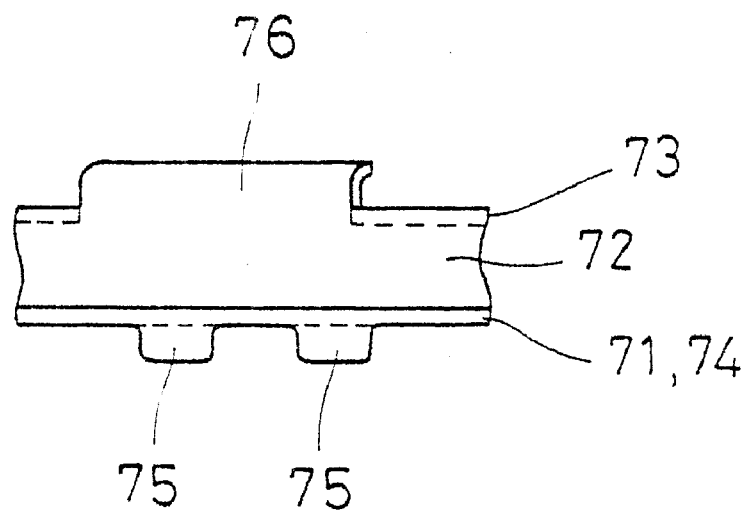
FIG. 10 is a partial edge elevational view of a part of the fixing plate illustrated in FIG. 8 as viewed along an arrow X of FIG. 8.
Figure 11:
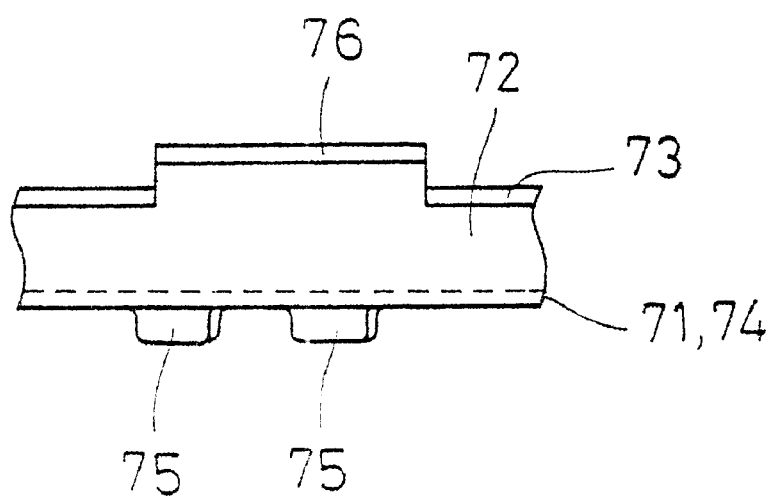
FIG. 11 is a partial edge elevational view of a part of the fixing plate illustrated in FIG. 8 as viewed along an arrow XI of FIG. 8.
Figure 12:
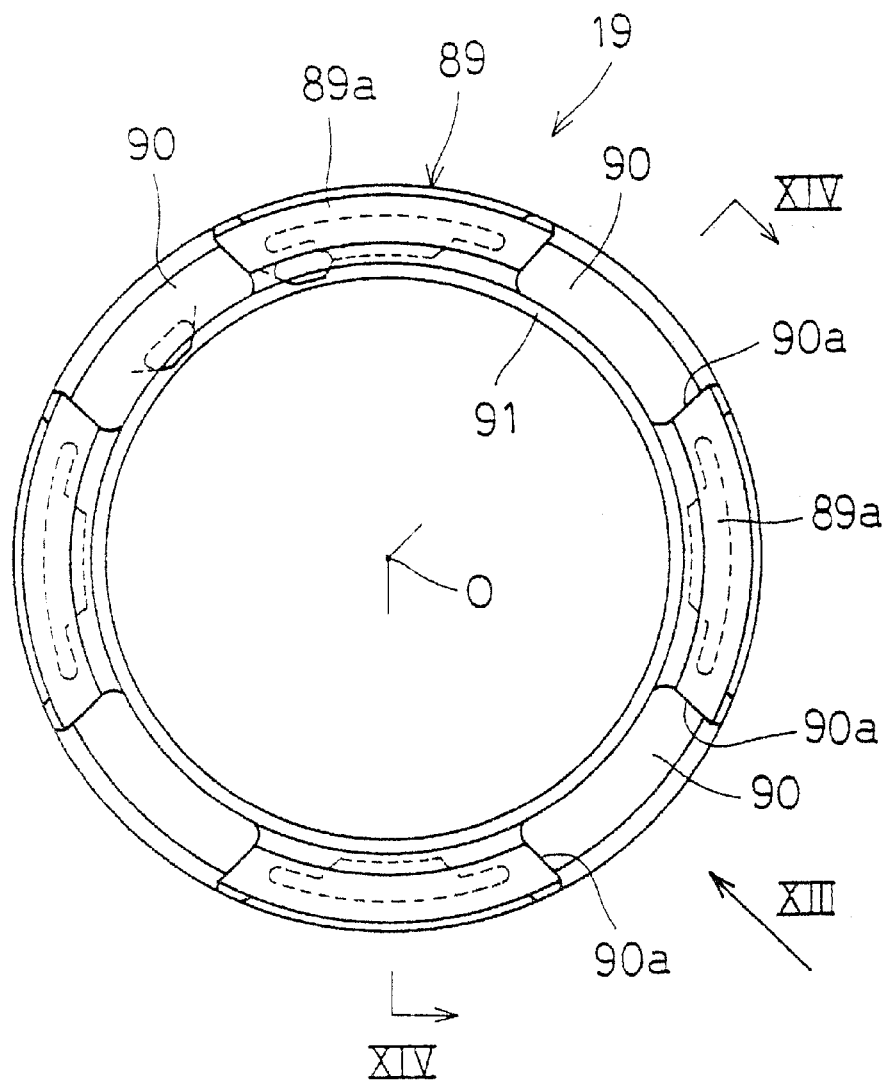
FIG. 12 is a front side elevational view of a bushing utilized with the clutch disk assembly illustrated in FIG. 1 in accordance with the present invention.
Figure 13:
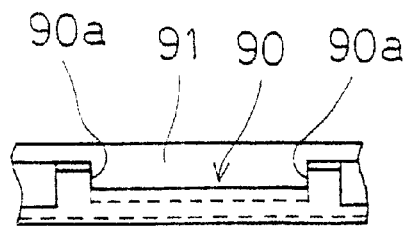
FIG. 13 is a partial edge elevational view of a part of the bushing illustrated in FIG. 12 as viewed along an arrow XIII of FIG. 12.

As seen in FIGS. 2 and 8, fixing plate 20 has four protrusions 74. Protrusions 74 project outwardly in a radial direction at equal intervals in a circular direction from the first disk-shaped portion 71 of the fixing plate 20. Each of the protrusions 74 is formed corresponding to the protrusions 82 of the spacer 80. Nails or tabs 75 of protrusions 74 are located within the cutouts 83 which are formed at the ends of the protrusions 82 of the spacer 80. In the structure mentioned above, the fixing plate 20 is fixedly connected with the hub flange 18 via the spacer 80 to be relatively unrotatably relative to each other. In other words, the fixing plate 20 is connected to hub flange 18 so that a torque can be transmitted from the hub flange 18 to fixing plate 20. In addition, the hub flange 18 via the spacer 80 supports the first axis side of the fixing plate 20. The fixing plate 20 is movable toward the second axis side away from the spacer 80 and the hub flange 18.

Referring to FIGS. 1–5, the first friction mechanism 8 that is formed between the fixing plate 20 and the retaining plate 32 will now be described in more detail. The first friction mechanism 8 includes a first friction washer 48 and a first cone spring 49. The first friction washer 48 is connected with the retaining plate 32 so as to be relatively non-rotatable, but axially movably relative to each other, and generates a friction by rubbing the fixing plate 20. The first friction washer 48 includes mainly an annular resin portion. The first friction washer 48 includes an annular portion 85 made of a resin and a friction portion 86.

The resin used to form the annular portion 85 generally includes a rubber type resin and a nylon type resin. For example, the resin, which is used for the annular portion 85, can be PPS (polyphenylensulfide) or PA 46 either of which is a polyamide type nylon resin. When the annular portion 85 is not molded, PPS is preferred, and when the annular portion 85 is molded, PA 46 is preferred. The description mentioned above can be applied to other annular resin portion mentioned herein.

A friction portion 86 is molded to or bonded to the fixing plate 20 side of the annular portion 85. The friction portion 86 is a portion that is designed to increase a friction coefficient between the first friction washer 48 and the fixing plate 20, and extends in an annular or disk-like shape. The annular portion 85 has a plurality of rotationally connecting portions 87 extending toward the second axis side. These connecting portions 87 are formed at the inner circumference of the annular portion 85. The rotationally connecting portions 87 are inserted in a plurality of cutouts 53 which are formed in a center hole 52 (inner circumferential edge) of the retaining plate 32. In this way, the first friction washer 48 is connected with the retaining plate 32 relatively non-rotatable, but in an axially movable manner. In addition, in the annular portion 85, connecting portions 88, which extend outward in a radial direction from the outer circumferential edge and then extend toward the second axis side. The connecting portions 88 are relatively thin and have a tab or detent portion at the end. The connecting portions 88 are inserted in holes 54, which are formed at the retaining plate 32, and its tab or detent portions of connecting portions 88 are connected with the retaining plate 32. The connecting portions 88 urge itself outward in a radial direction when it is connected, and press itself against the holes 54. Therefore, after partially assembling (sub-assembling), the first friction washer 48 is difficult to remove from the retaining plate 32. In this way, at the first friction washer 48, the rotationally connecting portions 87 transmit a torque and the connecting portions 88 connect temporarily a portion of first friction washer 85 with the retaining plate 32. The connecting portions 88 are thin and able to bend. Since the connecting portions 88 have a low rigidity, it will not typically break during sub-assembling. Therefore, since a force is not applied to the rotationally connecting portions 87 during sub-assembling, the first friction washer 48 is less likely to be broken than the conventional resin friction washer which have a tab or detent portion of radially connecting portions 88 to connect a retaining plate 32. In addition, since a press fitting machine is not necessary during sub-assembling, equipment cost can be reduced.

The first cone spring 49 is disposed between the first friction washer 48 and the inner circumference of the retaining plate 32. The first cone spring 49 is compressed in an axial direction between the retaining plate 32 and the first friction washer 48. The outer circumferential edge of the first cone spring 49 is supported by the retaining plate 32, while the inner circumferential edge of the first cone spring 49 contacts the annular portion 85 of the first friction washer 48. As seen in FIG. 2, the first cone spring 49 has a plurality of cutouts 49a formed on its inner circumferential side. It can be thought that the cutouts 49a at the inner circumferential edge form a plurality of projections on the inner circumferential edge of first cone spring 49. Projection parts that are formed on the outer circumferential side of the rotationally connecting portions 87 of the first friction washer 48 are inserted in the cutouts 49a. In this way, the first cone spring 49 is connected with the first friction washer 48 relatively non-rotatable manner.

Referring to FIGS. 8–11, at the second disk-shaped portion 73 of the fixing plate 20, several cut and lift parts 76 are formed at equal intervals in a circular direction. The cut and lift parts 76 are formed by cutting and lifting from the inner circumferential side of the second disk-shaped portion 73. The cut and lift parts 76 are disposed closer to the second axis side compared with other parts of the second disk-shaped portion 73. At a part of the second disk-shaped portion 73 where the cut and lift parts 76 are formed, a cutout part is formed as seen in FIG. 8. A supporting part 77 is formed at both ends of the cutout part in a circular direction.

Figure 14:
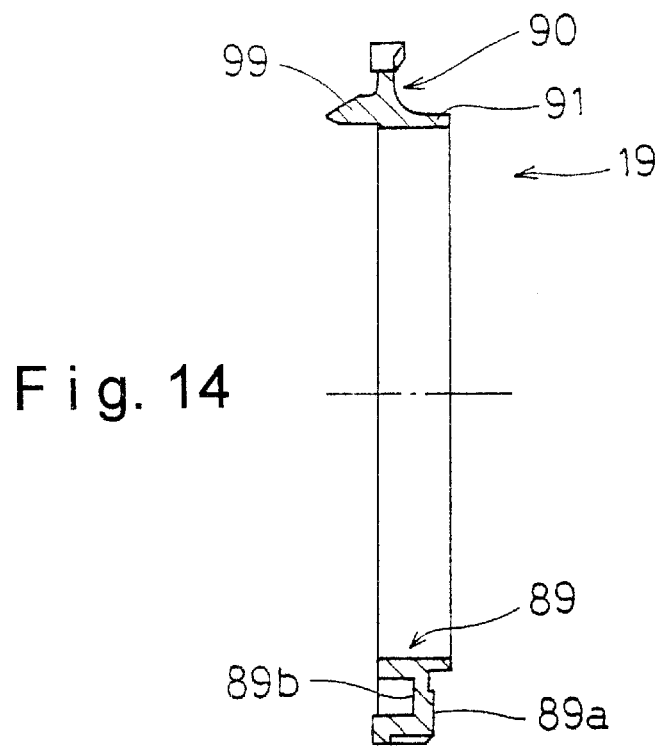
FIG. 14 is a cross sectional view of the bushing illustrated in FIG. 12 as viewed along section line XIV—XIV in FIG. 12.
Figure 15:
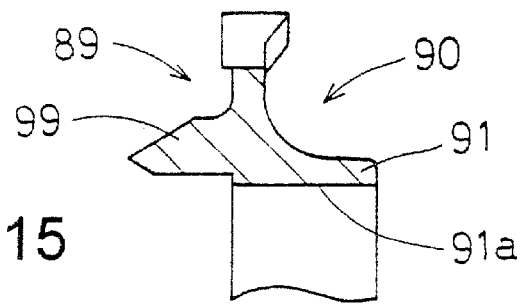
FIG. 15 is an enlarged, partial cross sectional view of a part the bushing illustrated in FIGS. 12–14.

A bushing 19 operates as an output portion in the second dampening mechanism 6. The bushing 19 is connected with the hub 3 in a relatively non-rotatable manner. In particular, the bushing 19 is an annular resin portion, which is disposed on the second axis side of both the internal teeth 61 of the hub flange 18 and the external teeth 65 of the hub 3. The bushing 19 is also located on the inner circumferential side of the cylinder-shaped portion 72 of the fixing plate 20, and in a space on the outer circumferential side of the second axis side part of the boss 62. The bushing 19 includes mainly an annular portion 89 with a plurality of spring receptacles 90, as shown in FIGS. 12 to 19. The spring receptacles 90 are formed at equal intervals in a circular direction at the side face of the second axis side of the annular portion 89. The spring receptacles 90 are formed at locations corresponding to the cut and lift parts 76 or the cutout parts of the fixing plate 20. The spring receptacles 90 are concave parts that are formed at the side face of the bushing 19 on the second axis side. The concave parts, as shown in FIGS. 14 and 15, are formed smoothly so that its cross section forms a part of a circle. In addition, a hole is formed that penetrates in an axial direction each spring receptacle 90 at its center in both radial and circular directions. At the inner circumference of the annular portion 89, an inner circumferential supporting part 91 is formed with a cylinder like shape. The supporting part 91 extends toward the second axis side from the annular portion 89. An inner circumferential face 91a of the bushing 19 is formed by the inner circumferential supporting part 91. This inner face 91a touches or is close to the outer circumferential face of the boss 62. A side face 89a is formed on the second axis side of the annular portion 89 of the bushing 19. This side face 89a touches the side face of the first axis side of the second disk-shaped portion 73 of the fixing plate 20.

The second friction mechanism 10 is formed between the annular portion 89 of the bushing 19 and the second disk-shaped portion 73 of the fixing plate 20. The second springs 21 are disposed within each of the spring receptacles 90. The second springs 21 are preferably coil springs that are smaller than the first spring 16 or the spring 17. The second spring 21 also has spring constants that are smaller than the first spring 16 or the spring 17. The second springs 21 are disposed within the spring receptacles 90 with the ends of the second springs 21 in a circular direction touching or close to both ends of the spring receptacles 90 in a circular direction. Both the axially inside part (the first axis side) and the inner circumferential side of the second springs 21 are supported by the bushing 19 within the spring receptacles 90.

The supporting parts 77 of the fixing plate 20 are connected in a rotary direction with both the circular ends of the second springs 21. In this way, a torque is transmitted from the fixing plate 20 to the bushing 19 via the second springs 21. The first axis side of the end face of the second springs 21 in a circular direction is totally supported by the circular end of the spring receptacles 90. In addition, the circular end faces of the second springs 21 are supported by supporting parts 77. Thus, the second spring 21 has a large connecting margin at both circular ends. In other words, at both circular ends of the second springs 21 the area of a part, which is supported increases. This arrangement is made possible by disposing the second springs 21 at a location, which is shifted in an axial direction from the conventional location between a hub 3 and a hub flange 18. Consequently, a spring sheet can be removed, resulting in the reduced number of parts.

The cut and lift parts 76 are disposed so as to support the axial outsides (the second axis sides) of the second springs 21. Thus, the outer circumferential side and the axial outsides of the second springs 21 are supported by the fixing plate 20.

Figure 16:
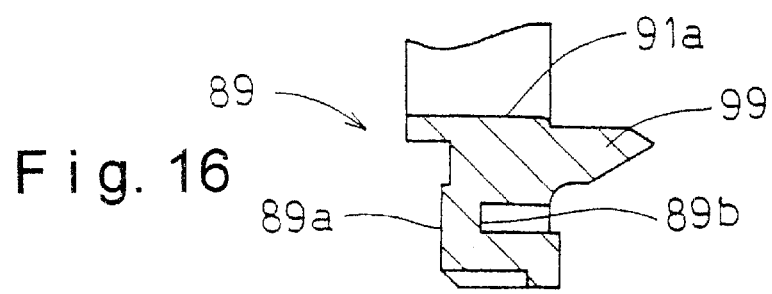
FIG. 16 is an enlarged, partial cross sectional view of a part the bushing illustrated in FIGS. 12–15 as viewed along section line XVI—XVI of FIG. 17.
Figure 17:
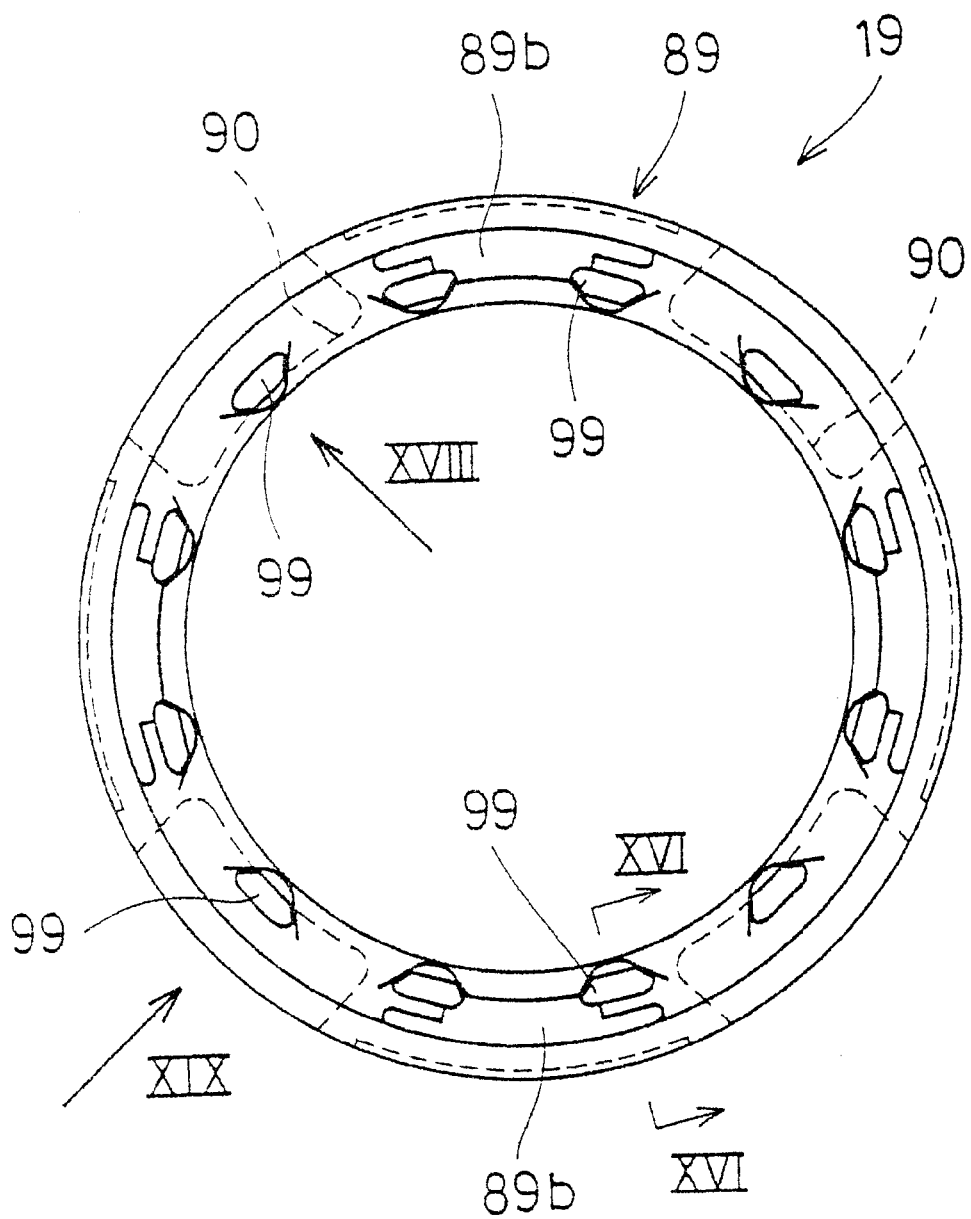
FIG. 17 is a back side elevational view of the bushing illustrated in FIGS. 12–16 for use with the clutch disk assembly illustrated in FIG. 1 in accordance with the present invention.
Figure 18:
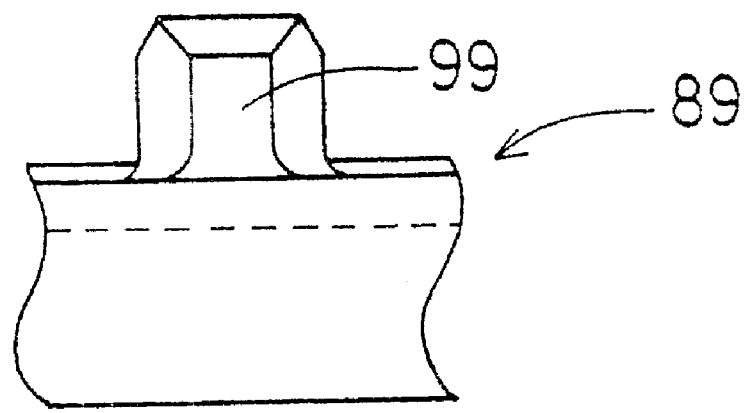
FIG. 18 is an enlarged, partial cross sectional view of a part the bushing illustrated in FIGS. 12–17 as viewed along an arrow XVIII of FIG. 17.
Figure 19:
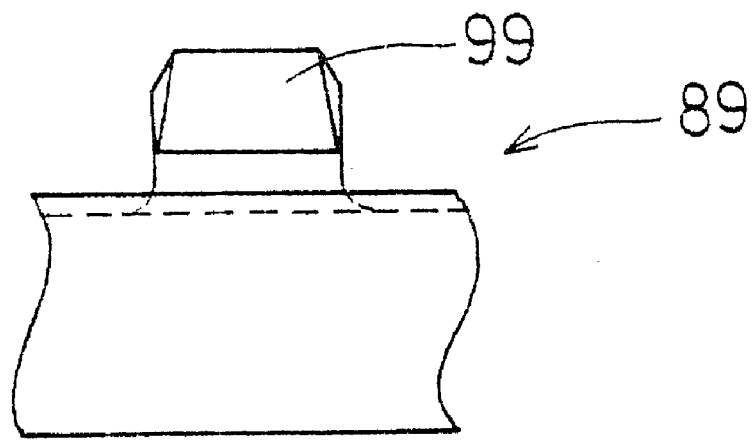
FIG. 19 is an enlarged, partial cross sectional view of a part the bushing illustrated in FIGS. 12–18 as viewed along an arrow XIX in FIG. 17.

As seen in FIGS. 4, 16 and 17, several connecting parts 99 are formed at the bushing 19 that extend from the annular portion 89 toward the first axis side. The connecting parts 99 are projections that extend toward the first axis side for transmitting a torque from the bushing 19 to the hub 3. The connecting parts 99 have cross sections that fit into gaps between the external teeth 65. The connecting parts 99 are inserted between the external teeth 65 of the hub 3. Thus, the connecting parts 99 are connected with the external teeth 65 in an unmovable manner in a circular direction.

A second cone spring 78 is an urging portion in the second friction mechanism 10 to urge the second disk-shaped portion 73 and the annular portion 89 towards each other in an axial direction. The second cone spring 78 is disposed in an axial direction between the bushing 19 and the external teeth 65 of the hub 3 and the internal teeth 61 of the flange 18. The inner circumference of the second cone spring 78 is supported by the flange 64 of the hub 3, while the outer circumference of the second cone spring 78 touches the annular portion 89 of the bushing 19. The second cone spring 78 is compressed in an axial direction, and urges the bushing 19 toward the second axis side. As the result, the side face 89a of the second axis side of the annular portion 89 of the bushing 19 and the side face of the first axis side of the second disk-shaped portion 73 of the fixing plate 20 are urged towards each other in an axial direction by a predetermined force. The second cone spring 78 has inner and outer diameters smaller than those of the first cone spring 49. The second cone spring 78 also has a thickness that is much smaller than that of the first cone spring 49. Thus, an urging force of the second cone spring 78 is much smaller than that of the first cone spring 49. At an inner circumferential edge the second cone spring 78 has a plurality of cutouts formed at an inner circumferential edge of the second cone spring 78. It can be thought that the cutouts of the cone spring 78 form a plurality of projections at the inner circumferential edge. The connecting parts 99 mentioned above extend within the cutouts of the cone spring 78.

As described above, the fixing plate 20 operates in the second dampening mechanism 6 as an input portion to connect with the second springs 21, as a portion included in the second friction mechanism 10, and as a portion included in the first friction mechanism 8. An advantage for the use of the fixing plate 20 is described as follows. The fixing plate 20, as described above, operates in the second dampening mechanism 6 as an supporting portion to support both ends of the second springs 21 in a circular direction and as an portion included in the second friction mechanism 10. Thus, one portion has two functions, resulting in a small number of parts. In addition, the fixing plate 20 supports the outside in an axial direction of the second spring 21. Furthermore, the fixing plate 20 includes friction faces both for the second friction mechanism 10 to generate a friction by rubbing at the first step of the torsion characteristic and for the first friction mechanism 8 to generate a friction by rubbing at the second step of the torsion characteristic. Thus, one portion has two friction faces, resulting in an easy adjustment and control of the friction characteristic of both friction faces. In other words, rubbing faces for both a flange of a boss and a hub flange are not necessary to be controlled, being different from that of the conventional dampening mechanism. Particularly, since the fixing plate 20 has a small size and a simple structure, being different from the conventional hub or hub flange, it is easy to control its friction face. Since the fixing plate 20 mentioned above is made of a metal plate, the fixing plate 20 with a desired shape can be obtained easily by press working, resulting in a low cost of the fixing plate 20.

An advantage of the bushing 19 is described as follows. Since the bushing 19 is made of a resin, its desired shape can be obtained easily. Particularly, since it is made of a resin and the connecting parts 99 can be formed in a body, its production is easy. The connecting parts 99 are connected with the external teeth 65 of the hub 3 therebetween in a circular direction. Therefore, it is not necessary to form a particular hole or concave to connect with the hub 3. Consequently, the working process for the hub 3 does not increase. The bushing 19 operates as an output portion of the second dampening mechanism 6. The bushing 19 connects with both circular ends of the second springs 21, and includes a part of the second friction mechanism 10. Thus, a single portion performs a torque transmission and friction generation, resulting in the small number of total parts.

The second cone spring 78 which urges friction faces each other in an axial direction in the second friction mechanism 10 is supported by the flange 64 of the hub 3. Thus, the second cone spring 78 is not supported by a retaining plate, being different from the conventional one, but supported by a different portion. Therefore, a hysteresis torque at the first step of characteristic is stable. Therefore, it is easy to control the hysteresis torque of the first step. A retaining plate 32 supports both the conventional first and second urging portions. Therefore, an urging force of the first elastic portion may deform a retaining plate, resulting in a change of a posture of the second urging portion and a problem of an unstable urging force of the second urging portion. In this embodiment, an urging force of the first cone spring 49 and that of the second cone spring 78 are applied to the fixing plate 20 each other in an axially opposite direction. In other words, the first cone spring 49 urges the fixing plate 20 via the first friction washer 48 toward the first axis side, on the contrary the second cone spring 78 urges the fixing plate 20 via the bushing 19 toward the second axis side.

The structure of the second stopper 12 is not to apply a torque to each portion of the second dampening mechanism 6, when a torque is large. A torque is not applied to the bushing 19, the second coil springs 21 and the fixing plate 20 within a range of the second step of the torsion characteristic. Consequently, each portion does not need a very large strength and its design is easy.

Figure 20:
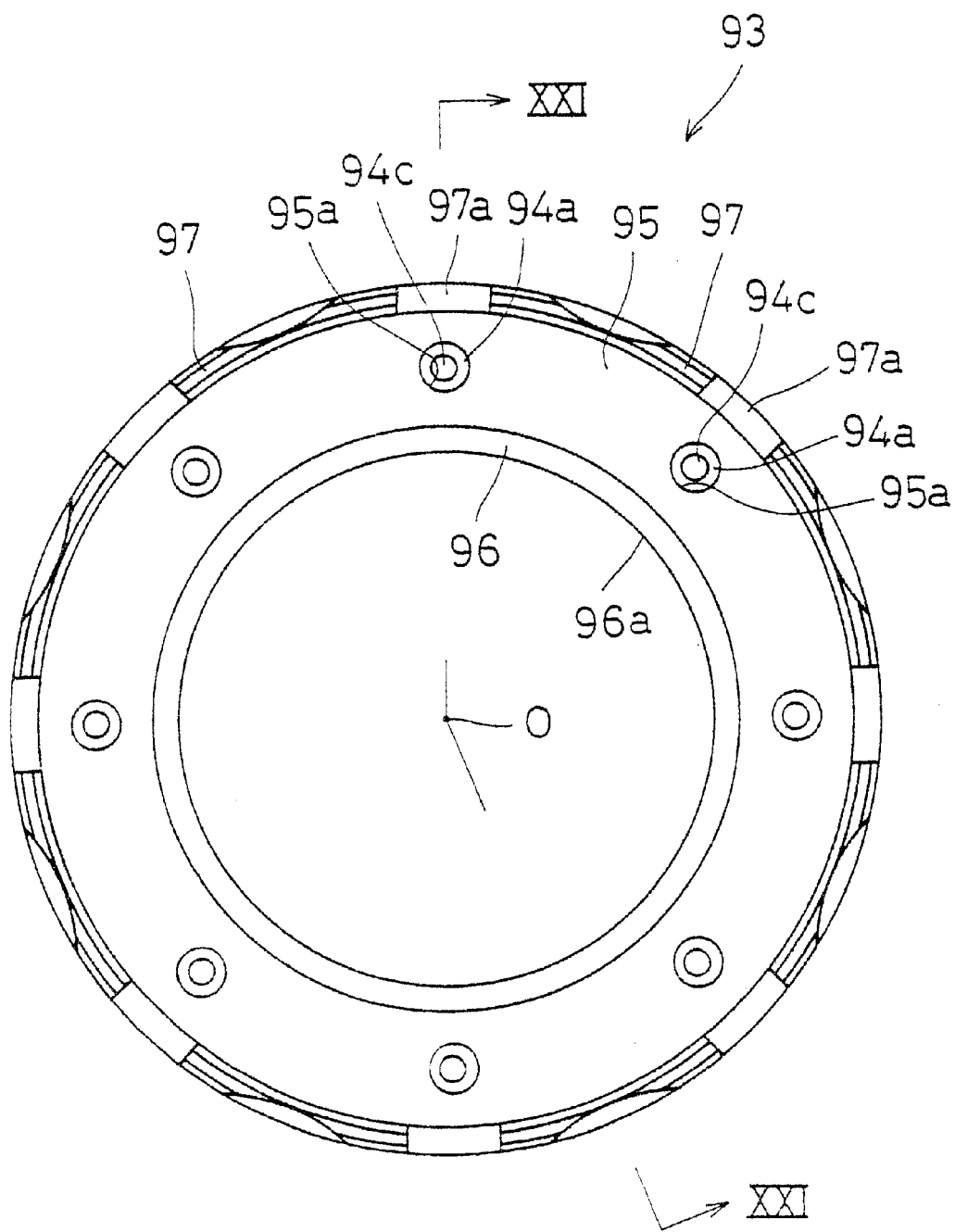
FIG. 20 is a front side elevational view of a friction bushing for use with the clutch disk assembly illustrated in FIG. 1 in accordance with the present invention.
Figure 21:
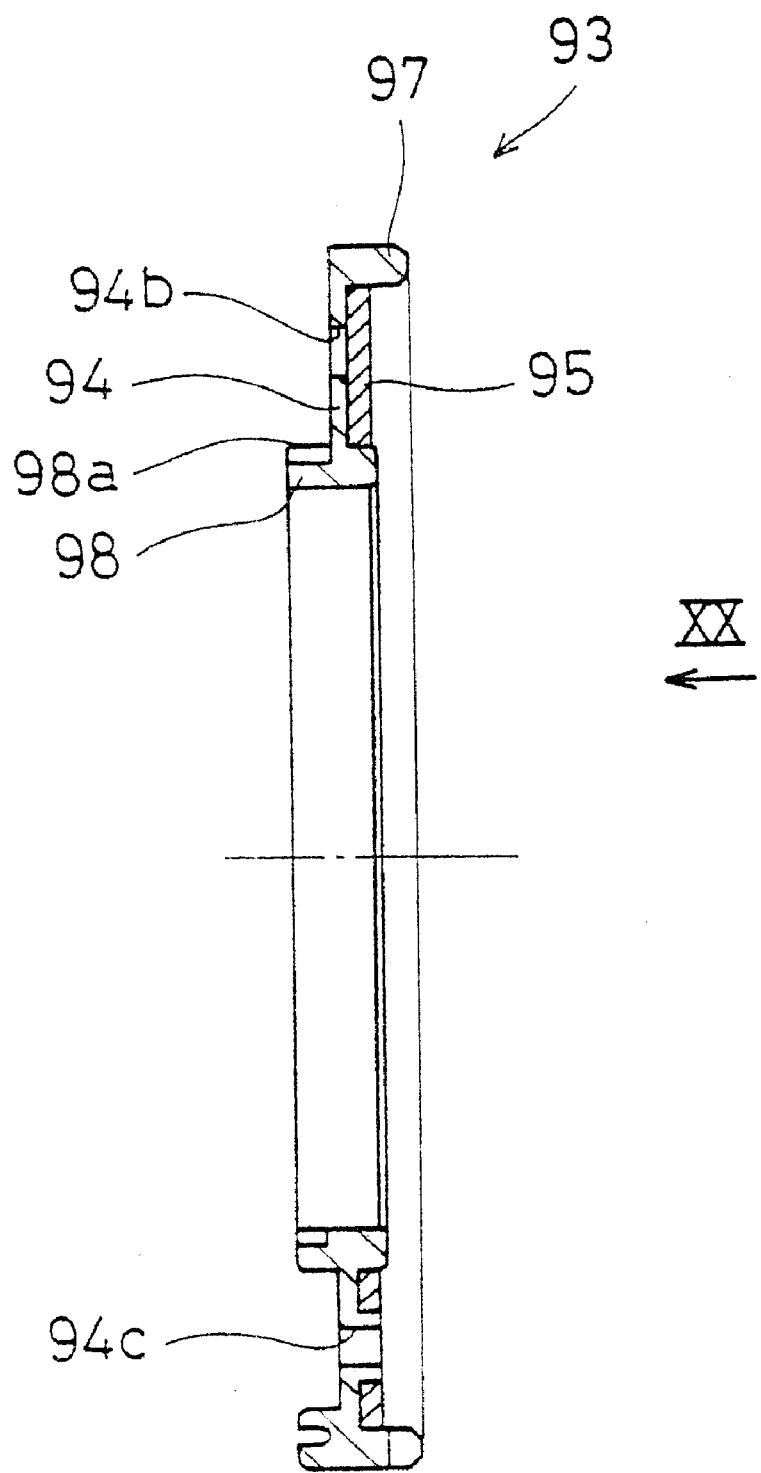
FIG. 21 is a cross sectional view of the friction bushing illustrated in FIG. 20 as viewed along section line XXI—XXI of FIG. 20.
Figure 22:
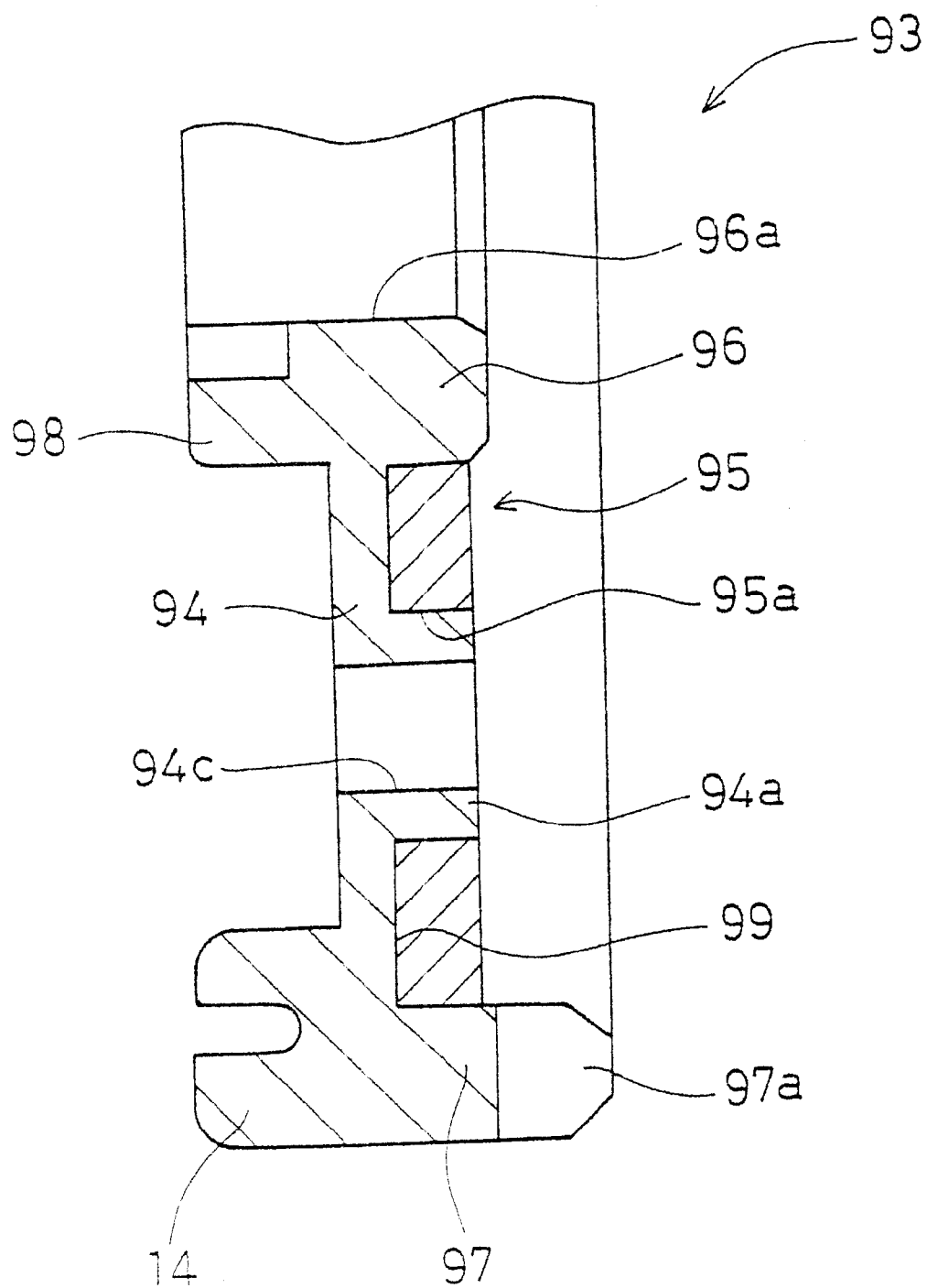
FIG. 22 is an enlarged, partial cross sectional view of a part the friction bushing illustrated in FIG. 21.

Referring to FIGS. 3–5 and 20–22, a bushing 93, which forms a part of a third dampening mechanism, will now be described in more detail. The bushing 93 is disposed at the inner circumference of the clutch plate 31 and touches the outer circumferential face of the hub 3, the end face of the flange 64, the external teeth 65, the cylinder-shaped portion 59 of the hub flange 18 and the internal teeth 61. Functions of the bushing 93 includes dampening vibrations in a rotary direction by generating a friction, locating the clutch plate 31 for the hub 3 in a radial direction, and locating the hub flange 18 for the hub 3 in a radial direction. The bushing 93, as shown in FIGS. 20 to 22, includes mainly an annular resin portion 94. The annular portion 94 is a disk-shaped portion that has a predetermined width in a radial direction and a small thickness in an axial direction. The annular portion 94 is disposed between the inner circumference of the clutch plate 31 and that of the hub flange 18 in an axial direction. An annular friction portion 95 is molded to, bonded to, or simply disposed at the annular portion 94 on the second axis side. The friction portion 95 has an annular shape, with a disk-shaped portion, which has a predetermined width in a radial direction and a small thickness in an axial direction. The friction portion 95 is made of a material with a high friction coefficient, for example, a rubber type material, a glass type mixed fiber spinning or impregnated compact or a ceramic. The friction portion 95 gives a characteristic of a high friction coefficient to the bushing 93. The magnitude of its friction can be adjusted by selecting the material of friction portion 95.

As shown in a plan view of FIG. 20, the inner and outer diameters of the annular portion 94 and the friction portion 95 are circular. The friction portion 95 can be thought to be disposed so as to touch the side face of the annular portion 94 on the second axis side, or thought to be disposed within a channel, which is formed at the side face of the annular portion 94 on the second axis side. In other words, a cylinder-shaped part 96 extends toward the second axis side, and is formed at the inner circumferential edge of the annular portion 94, with a cylinder-shaped part 97 extending toward the second axis side at its outer circumferential edge. An annular space surrounded by the cylinder-shaped portions 96 and 97 forms a channel of the annular portion 94. Inner and outer diameters of the channel are circular, and the friction portion 95 is disposed within the channel.

The cylinder-shaped portion 96 touches the side face of the flange 64 of the hub 3 on the first axis side as seen in FIG. 4. This portion rubs within a range of the first step of the torsion. The friction portion 95 touches the cylinder-shaped portion 59 of the hub flange 18 and the end face of the internal teeth 61 on the first axis side. This portion rubs within a range of the second step of the torsion. A small gap is secured between the friction portion 95 and the side face of the external teeth 65 of the hub 3 on the first axis side. The cylinder-shaped portion 59 of the hub flange 18 and the end face of the internal teeth 61 on the first axis side touch only the friction portion 95 in an axial direction.

Several holes 95a are formed side by side in a circular direction at the friction portion 95, and projections 94a of the annular portion 94 are inserted in the holes 95a. In this way, a whirl stop between the annular portion 94 and the friction portion 95 is performed. Particularly, since the friction portion 95 has a circular shape, such a whirl stop plays an important role. In the conventional friction portion, when it has a circular shape, there is a possibility to cause a problem concerning its strength, such as a peeling by adhering to a backboard made of SPCC steel according to Japanese Industrial Standards (JIS). Therefore, in the conventional friction portion, a whirl stop is performed by using a friction portion with a square shape. While the friction portion 95 in accordance with the present invention has a simple structure with a circular shape, it does not have a problem such as a peeling. Particularly, it is easy to form the holes 95a of the friction portion 95 and to form the projections 94a of the annular resin portion 94, resulting in a reduction of a cost.

In the present embodiment, since the friction portion 95 is not fixedly coupled to the annular portion 94, the friction portion 95 can come off in an axial direction. Therefore, a working such as a bonding is not necessary. However, in this embodiment in accordance with the present invention, the friction portion 95 may be bonded to the annual portion 94.

Several holes 94b are formed side by side in a circular direction in the annual portion 94. The holes 94b extend in an axial direction. The holes 94b connect the first axis side and second axis side of the annular portion 94, and expose a part of the side face of the friction portion 95 on the first axis side. As seen in FIG. 3, holes 13 are formed at the inner circumference of the clutch plate 31, corresponding to the holes 94b. The holes 13 have a diameter larger than that of the holes 94b, and expand to the circumference of the holes 94b. Thus, a part of the friction portion 95 is exposed to the outside of the clutch disk assembly 1 through the holes 94b and the holes 13 which are formed at corresponding positions. Therefore, the friction portion 95 is cooled sufficiently, in other words the friction portion 95 radiates a heat to an atmosphere on the clutch plate 31 side, resulting in a prevention of a change of a friction characteristic by a friction heat of the friction portion 95. The endurance strength of the friction portion 95 is improved, and a fall of a hardness of the hub 3 and the hub flange 18 is prevented. In addition, holes 94c are formed that extend in an axial direction and penetrate the projections 94a. The holes 94c connect the first and second axis sides of the annular portion 94. The holes 94b and 94c reduce a total volume of the bushing 93, resulting in a reduction of an amount of a resin used and a reduction of a cost.

A cylinder-shaped part 98 extending toward the first axis side is formed at the inner circumferential edge of the annular portion 94. The inner circumferential face of the cylinder-shaped portions 96 and 98 touches the outer circumferential face of the boss 62. In this way, a positioning (centering) of the clutch plate 31 and the retaining plate 32 against the hub 3 in a radial direction is performed. In addition, a channel 98a connecting with a plurality of projections which are formed at the inner circumferential edge of the clutch plate 31 is formed at the outer circumferential face of the cylinder-shaped portion 98. In this way, the bushing 93 rotates together with the clutch plate 31 in a body, and can rub the flange 64 of the hub 3 and the cylinder-shaped portion 59 of the hub flange 18.

Pluralities of cutouts 97a are formed at the cylinder-shaped portion 97. The internal side face of the cylinder-shaped portion 97 in a radial direction touches the outer circumferential face on the first axis side of the cylinder-shaped portion 59 of the hub flange 18. In other words, the hub flange 18 is positioned by the cylinder-shaped portion 97 of the bushing 93 in a radial direction against the hub 3, the clutch plate 31 and the retaining plate 32.

Pluralities of connecting parts 14 extending toward the first axis side are formed at the outer circumferential edge of the annular portion 94. The connecting parts 14 are formed at equal intervals in a circular direction. The connecting parts 14 have nail like shapes, and are connected with a hole 15 which is formed at the clutch plate 31 as seen in FIG. 4. Thus, the bushing 93 is temporarily connected with the clutch plate 31 in an axial direction.

The bushing 93 mentioned above positions the clutch plate 31 against the hub 3 in a radial direction by touching the outer circumferential face of the boss 62, and generates a hysteresis torque of the first and second steps by a friction face touching each of the flange 64 and the cylinder-shaped part 59. Thus, a single portion has a plurality of functions, resulting in a reduced number of total parts.

When the clutch disk 33 of the input rotary portion 2 is pressed against a flywheel (not shown in the Figures), a torque is input to the clutch disk assembly 1. The torque is then transmitted from the clutch plate 31 and the retaining plate 32 to the first spring 16, the hub flange 18, the spacer 80, the fixing plate 20, the second spring 21 and the bushing 19 in this order. Finally, the torque is output from the hub 3 to a transmission shaft (not shown in the Figures).

When a torque fluctuation from an engine is input to the clutch disk assembly 1, a torsion vibration or relative rotation is caused between the input rotary portion 2 and the hub 3, and the first springs 16, the springs 17 and the second springs 21 are compressed in a rotary direction.

Figure 7:
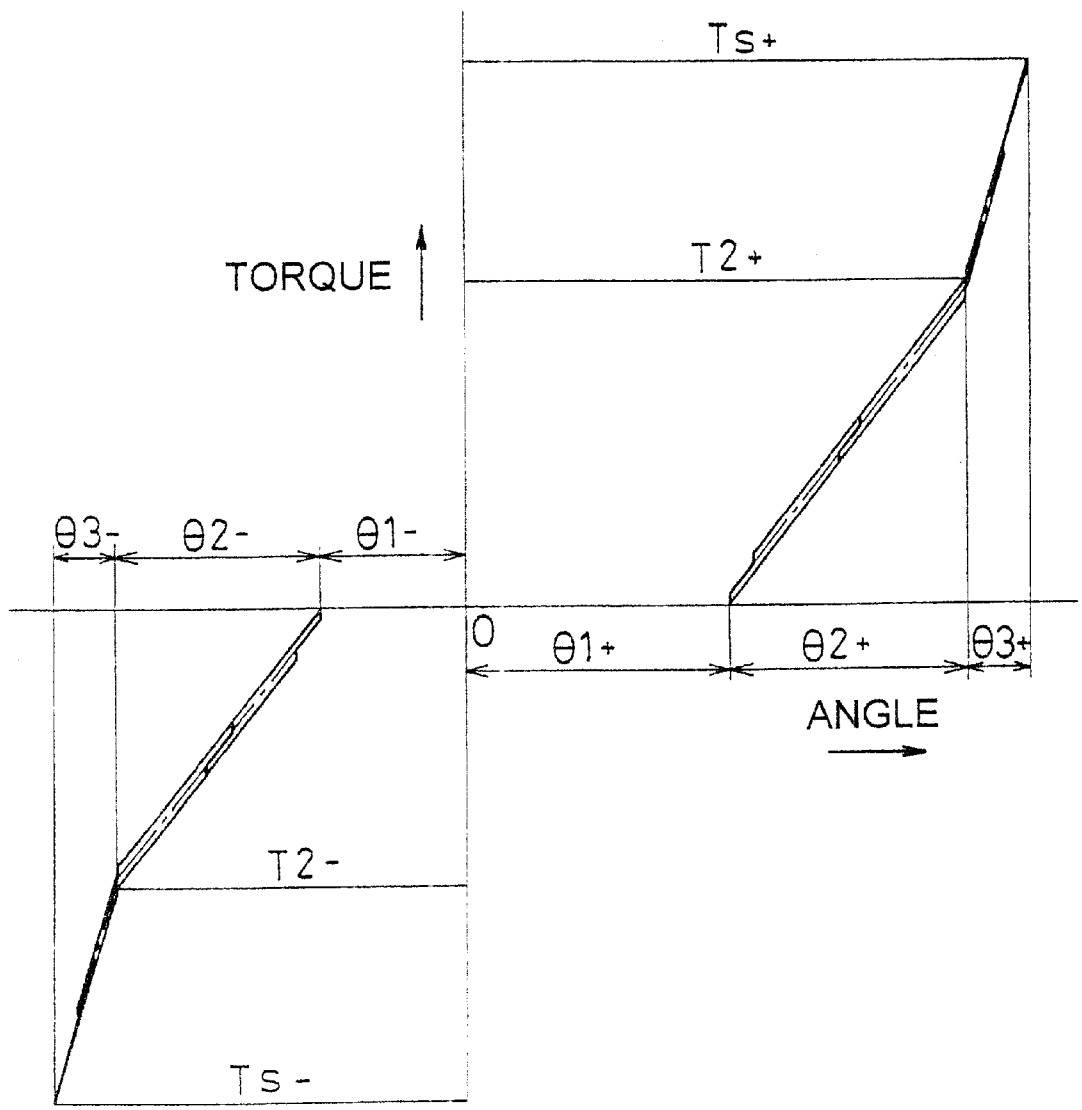
FIG. 7 shows a torsion characteristic curve of the clutch disk assembly in accordance with the present invention.

Referring to a machine circuit in FIG. 6 and a torsion characteristic curve in FIG. 7, an operation of the clutch disk assembly 1 as a dampening mechanism will now be described in more detail. The machine circuit shown in FIG. 6 indicates a schematic view of a dampening mechanism 4 formed between the input rotary portion 2 and the hub 3. In FIG. 6, an operating relation between portions will now be described, for example, when the hub 3 is twisted in a certain direction (for example, R2 direction) against the input rotary portion 2.

When the hub 3 is twisted in a R2 direction against the input rotary portion 2, mainly the second dampening mechanism 6 operates within a range of a torsion angle $\theta_1$. In other words, the second springs 21 are compressed in a rotary direction, causing a rubbing in the second friction mechanism 10. In this case, since a rubbing is not caused in the first friction mechanism 8, a characteristic of a high hysteresis torque cannot be obtained. As the result, a characteristic of the first step of a low rigidity and low hysteresis torque is obtained. When the torsion angle is over the torsion angle $\theta_1$, the second stopper 12 touches, resulting in a stop of a relative rotation between the hub 3 and the hub flange 18. In other words, the second dampening mechanism 6 does not operate when the torsion angle is over $\theta_1$. Thus, the second springs 21 are not compressed when the torsion angle is over $\theta_1$. Therefore, the second springs 21 are not likely to be broken. In addition, it is not necessary to consider the strengths of the second springs 21, which leads to an easy design. The first dampening mechanism 5 operates at the second step of a torsion characteristic. In other words, the first springs 16 are compressed in a rotary direction between the hub flange 18 and the input rotary portion 2, resulting in a rubbing in the first friction mechanism 8. As the result, a characteristic of the second step of a high rigidity and high hysteresis torque is obtained. When the torsion angle is over $\theta_1+\theta_2$, the end part of the springs 17 in a circular direction touches the second supporting part 37 of the second receptacle 36. In other words, in the second dampening mechanism 6, the first springs 16 and the springs 17 are compressed in parallel. As the result, a rigidity of the third step is higher than that of the second step. When the torsion angle is $\theta_1+\theta_2+\theta_3$, the first stopper 11 touches, resulting in a stop of a relative rotation between the input rotary portion 2 and the hub 3.

In a negative side of a torsion characteristic, a similar characteristic is obtained although a magnitude of each torsion angle ($\theta_1$, $\theta_2$, and $\theta_3$) is different. At the first step of a torsion characteristic, a friction is generated between the bushing 93 and both the flange 64 of the hub 3 and the external teeth 65. At the second and third steps, a friction is generated between the bushing 93 and the inner circumference of the hub flange 18.

When an abrasion of the bushing 19 progresses at a friction face between the annual portion 89 and the second disk-shaped portion 73 in the second dampening mechanism 6, it is thought that the bushing 19 moves from other portions toward the second axis side. If this happens, a posture of the second cone spring 78 changes, in particular, it arises. As the result, an urging force (setting load) of the second cone spring 78 changes. In particular, it once increases and then decreases. Thus, a magnitude of a hysteresis torque in the second friction mechanism 10 changes and is not stable.

In the present invention, however, the first cone spring 49 urges the fixing plate 20 toward the first axis side, and its urging force is applied to the hub flange 18 and the bushing 93. Therefore, when an amount of abrasion in the second friction mechanism 10 corresponds to or coincides with an amount of abrasion at a friction face between the bushing 93 and the hub flange 18, the following results can be obtained. When a part (the friction portion 95) of the bushing 93 corresponding to the cylinder-shaped part 59 of the hub flange 18 abrades, the hub flange 18, the spacer 80, the fixing plate 20 and the first friction washer 48 all move toward the first axis side corresponding to an amount of the abrasion. As the result, at the friction face in the second friction mechanism 10, the second disk-shaped portion 73 moves toward the first axis side. The location of the bushing 19 against the hub 3 in an axial direction hardly changes. Therefore, a posture of the second cone spring 78 which is disposed between the flange 64 and the bushing 19 hardly changes. Thus, an abrasion following mechanism using the hub flange 18 and the first friction mechanism 8 keeps a posture of the second cone spring 78 constant, regardless of an abrasion at the friction face of the second friction mechanism 10, resulting in a stable generation of a hysteresis torque in the second friction mechanism 10. As the result, a hysteresis torque that shows a small change with the passage of time can be obtained, leading to an improved sound and vibration performance. In addition, since it is not necessary to consider an abrasion margin of the second cone spring 78, the degree of freedom to design the second cone spring 78 increases. In particular, it is possible to design the second cone spring 78 with a low stress and a high load. A set load of the second cone spring 78 is set to be approximately a peak of a load characteristic in a corn spring. When an amount of abrasion in the bushing 19 is kept to be equal to that in the bushing 93, the load of the second cone spring 78 is kept to be approximately a maximum. When an amount of abrasion in the bushing 19 is different from that in the bushing 93, the set load shifts slightly from a peak of a load characteristic to both its side. In this case, an amount of variation of a set load is set so as to be a minimum, in addition its amount is predictable.

Another Embodiment

Figure 23:
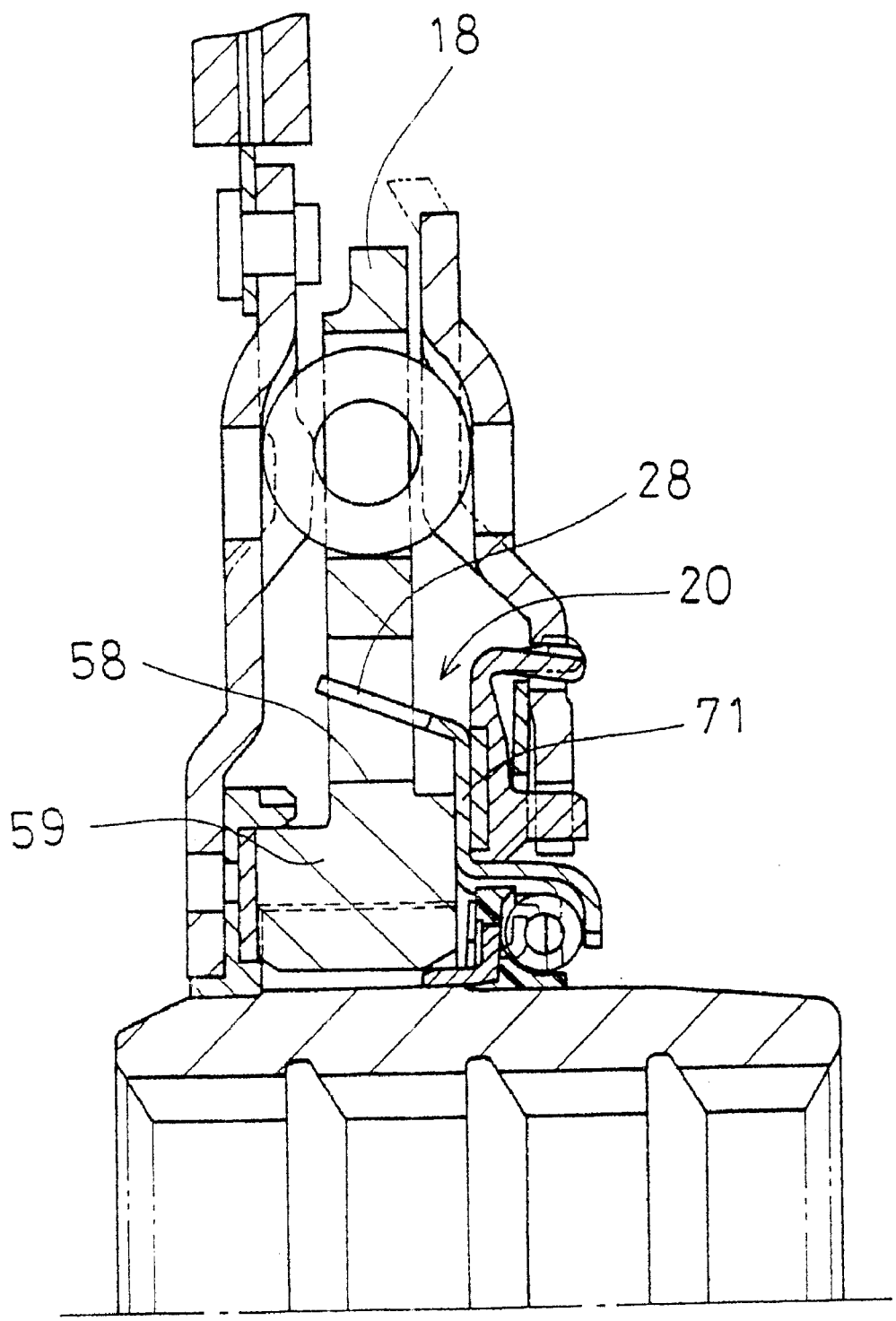
FIG. 23 is a partial cross sectional view of a part of a clutch disk assembly in accordance with another embodiment of the present invention, corresponding to FIG. 3 of the first embodiment.
Figure 24:
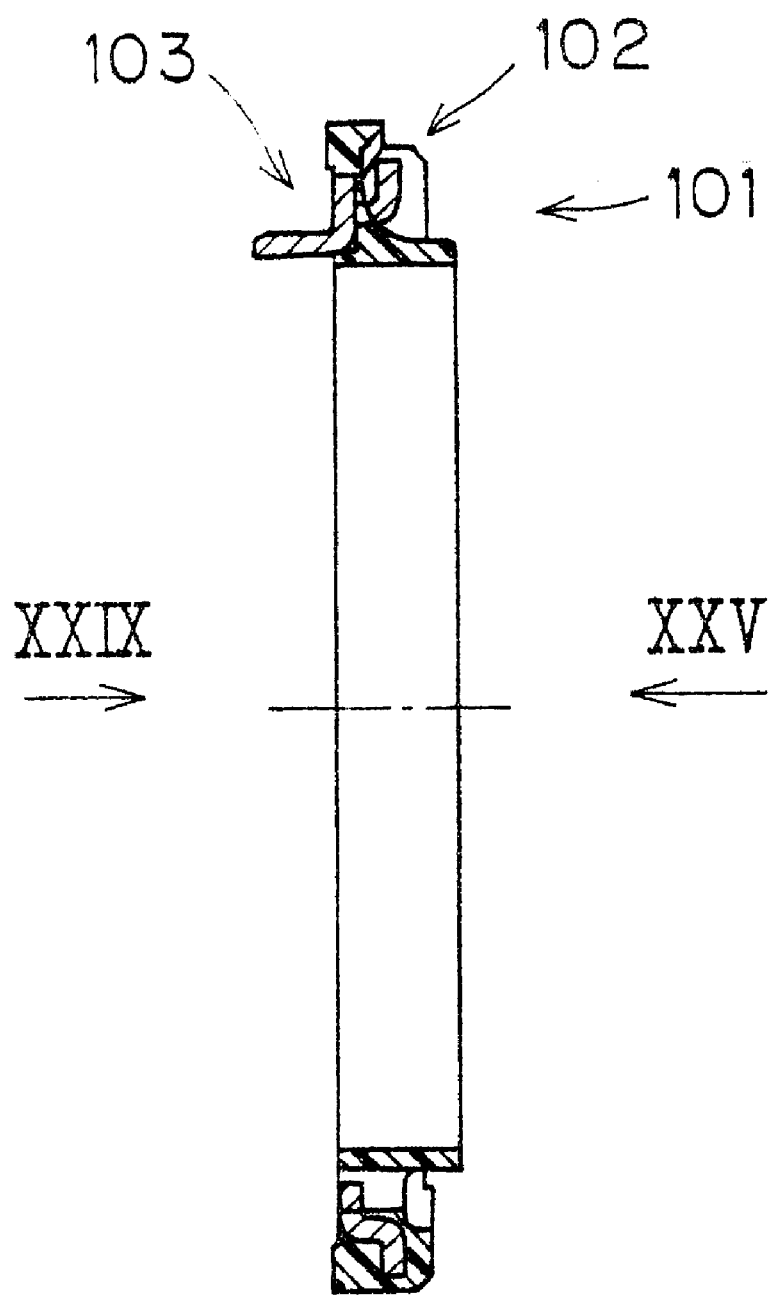
FIG. 24 is a longitudinal cross sectional view of a bushing in accordance with another embodiment of the present invention.

As shown in FIG. 23, the second dampening mechanism has been modified. In particular, the spacer 80, described in the above embodiment, has been removed, and a fixing plate 20 is now used which is directly coupled with the hub flange 18. A first disk-shaped part 71 of a fixing plate 20 is supported directly by a cylinder-shaped part 59 of a hub flange 18. In addition, connecting nails 28 extend from the outer circumferential edge of the first disk-shaped part 71 into connecting holes 58 of the hub flange 18. In this structure, the spacer 80 can be removed, resulting in a small number of parts.

In the machine circuit in FIG. 6, other elastic portion or a spring may be disposed at a location of a spacer 80. In that case, four steps of characteristic can be obtained. In a description of the present embodiment, such a phrase as "connect so as to rotate in a body" and "connect relatively unrotatably" means that both portions are disposed so as to be able to transmit a torque in a circular direction. In other words, it also contains a condition in which a gap is formed in a rotary direction between both portions and a torque is not transmitted between both portions within a predetermined angle.

As shown in FIGS. 24 to 30, a modified bushing 101 is illustrated that is used with the clutch disk assembly in FIG. 23. The bushing 101 is part of a modified dampening mechanism 6'. Thus, the function of the bushing 101 is roughly similar to that of the bushing 19 in the first embodiment. Thus, the differences between bushing 101 and bushing 19 will now be described in detail, while the same or similar parts will only be briefly described herein when referring to bushing 101.

The bushing 101 mainly includes an annular resin portion 102 and a metal connecting portion 103 coupled to the annular resin portion 102. The connecting portion 103 is preferably molded within the annular portion 102. Thus, portions 102 and 103 are fixedly coupled together to form integral members that are not separable from each other. The bushing 101 is part of a modified dampening mechanism 6' and supports a plurality of springs 21 to elastically couple fixing plate 20 of the hub flange 18 to the hub 3. The bushing 101 rotates with the hub 3, while the fixing plate 20 rotates with the hub flange 18. As mentioned above, the fixing plate 20 includes first disk-shaped part 71 and a second disk-shaped plate 73 to transmit torque from bushing 101 to the hub flange 18. The second disk-shaped plate 73 engages bushing 101 to generate a friction therebetween when the hub 3 and the hub flange 18 rotate relative to each other.

The bushing 101, in accordance with the present invention, is inexpensive to manufacture since a majority of bushings 101 are formed of resin. The connecting portion 103 has a high abrasion resistance and is connected with the torque transmitting portions (hub 3 and springs 21). Clearly, using metal for the connecting portion 103 results in less abrasion compared with resin.

Figure 25:
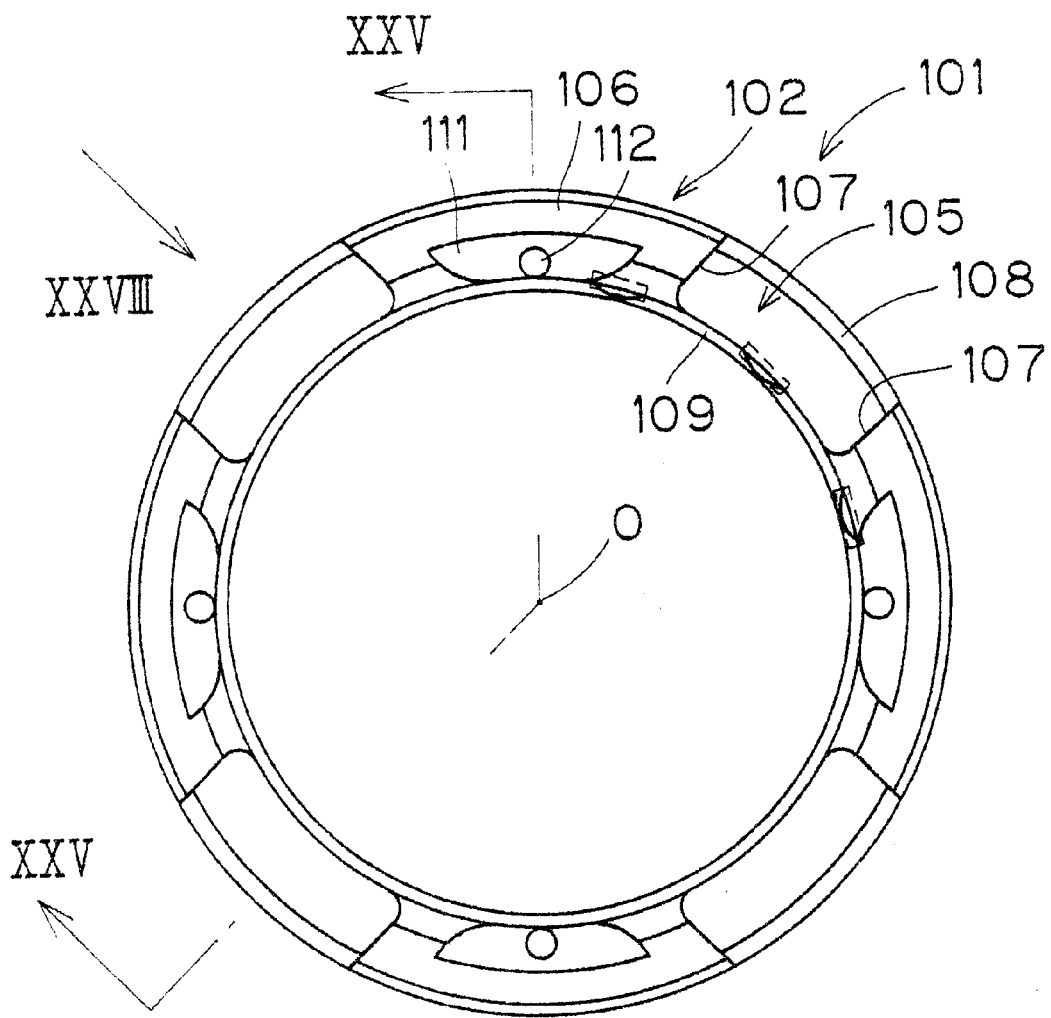
FIG. 25 is a right side elevational view of the bushing illustrated in FIG. 24 as viewed along arrow XXV in FIG. 24.
Figure 26:
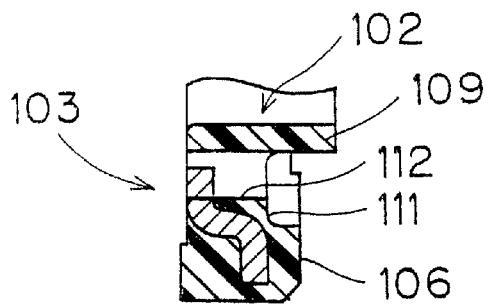
FIG. 26 is an enlarged partial cross-sectional view of a part of the bushing illustrated in FIGS. 24 and 25.
Figure 28:
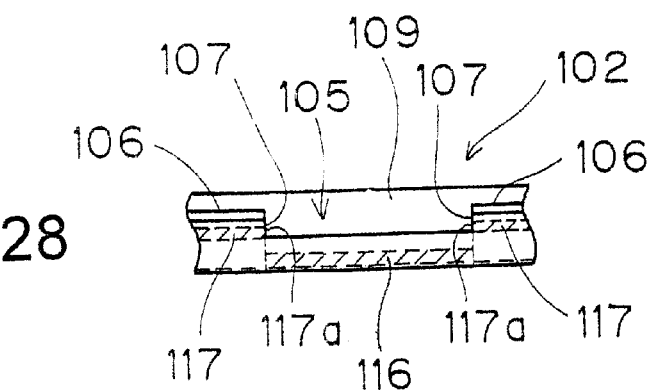
FIG. 28 is a partial top left elevational view of the bushing illustrated in FIGS. 24–27 as viewed along arrow XXVIII in FIG. 25.
Figure 29:
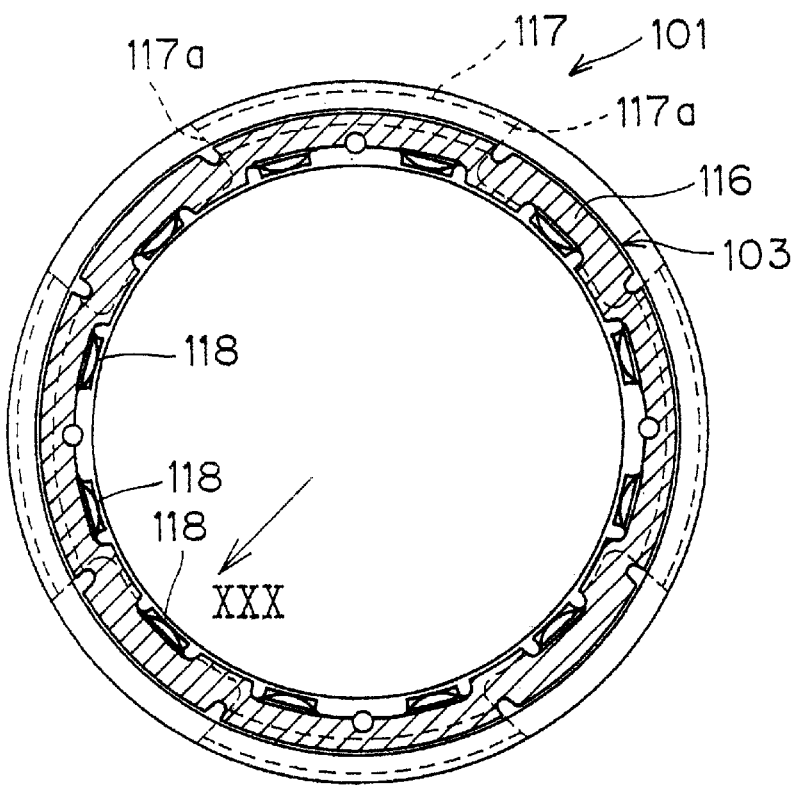
FIG. 29 is a left side elevational view of the bushing illustrated in FIGS. 24–27 as viewed along arrow XXIX in FIG. 24.
Figure 30:
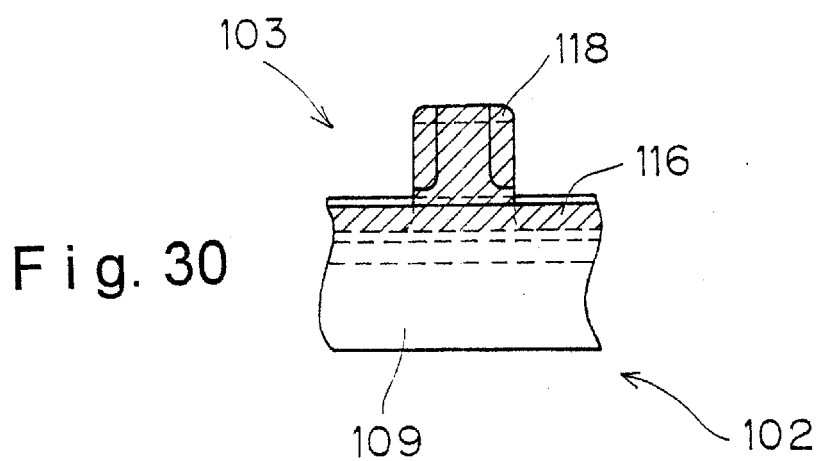
FIG. 30 is a partial inside view of the bushing illustrated in FIGS. 24–27 as viewed along arrow XXX in FIG. 29.

As seen in FIGS. 25, 26 and 28, the annular portion 102 includes a plurality of friction surfaces 106 and a plurality of spring receptacles 105. The spring receptacles 105 and the friction surfaces 106 are disposed alternately in a circular direction about the annular portion 102. The spring receptacles 105 are each a concave part formed at the outer periphery of the annular portion 102. Each of the spring receptacles 105 opens to the outside in both axial and radial directions. Each of the spring receptacles 105 has a pair of contacting surfaces 107, an outer inclined surface 108 and a curved peripheral bottom surface 110.

Figure 27:
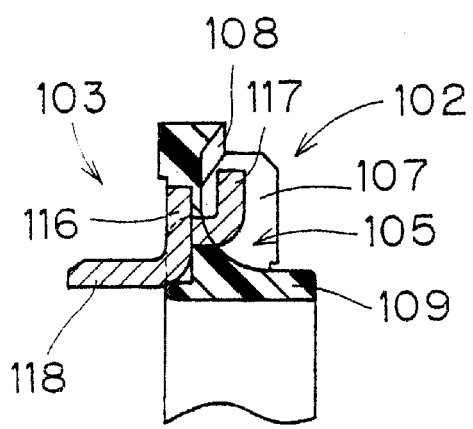
FIG. 27 is an enlarged partial cross-sectional view of a part of the bushing illustrated in FIGS. 24–26.

A contacting surface or abutment 107 is formed at both ends of each spring receptacle 105 in a circular direction. The contacting surfaces or abutments 107 touch or are close to both ends of the spring 21 in a circular direction so as to transmit a torque as discussed above in more detail in reference to the first embodiment. An inclined surface 108 is formed at the outside of each spring receptacle 105 and extends in a radial direction. The inclined surfaces 108 of the spring receptacles 105 are inclined upward in an axial direction. As best seen in FIGS. 25 and 27, a cylinder like part 109 of the annular portion 102 extending to the transmission side in an axial direction is formed at the inside of the spring receptacles 105 in a radial direction. The cross sections of the bottom surfaces 110 of the spring receptacles 105 in axial directions and that of the outer circumferential surface of the cylinder like part 109 show that both surfaces continue unitarily and smoothly. The springs 21 are seated within the spring receptacles 105, and the springs 21 are supported in an axial direction and radial direction, and both its ends in a circular direction are also supported.

The friction surfaces 106 are arc shaped, flat surfaces that extend long in a circular direction. A channel 111 is formed at the middle of each of the friction surfaces 106 in their circular directions and at the inside of the friction surfaces 106 in their radial directions. A hole 112 is formed at the inside of the channel 111 in a radial direction and at the center of the channel 111 in a circular direction and passes through each of the channels 111 in their axial directions.

The connecting portion 103 is an annular metal plate portion. The connecting portion 103 includes an annular part 116, a supporting part 117 and a connecting part 118 as seen in FIG. 27. The annular part 116 is molded into an axial surface of the annular portion 102 on the engine side by conventional molding techniques. The total surface of the annular part 116 on the engine side is exposed. However, the annular part 116 may be buried within the annular portion 102, or a part of the annular part 116 may project in an axial direction from the annular portion 102.

The supporting part 117 is formed from the annular part 116 by cutting and bending a plurality of sections of the annular part 116. Thus, the supporting part 117 is formed of a plurality of L-shaped flanges that are circumferentially spaced apart about the annular part 116. The supporting part 117 has a structure to be able to transmit a torque to both ends of the spring in a circular direction. Parts of the supporting part 117 corresponding to the friction surfaces 106 are bent toward the engine side in an axial direction and extends outward in a radial direction, as shown in FIGS. 27 and 28. The disk like part extending outward in a radial direction is disposed on the transmission side of the annular part 116 in an axial direction. Touching surfaces 117a are exposed totally to the touching surfaces 107 of the spring receptacles 105 which are at ends of the supporting part 117 in a circular direction. In other words, both ends of the springs 21 in a circular direction touch not only the touching surfaces 107 but also the touching surface 117a of the supporting part 117. As mentioned above, since both ends of the spring 21 in a circular direction are supported by the supporting part 117 made of metal, the resin portion is abraded less often.

The connecting part 118 of the connecting portion includes a plurality of protrusions extending in an axial direction from the radially inside of the annular part 116 toward the engine side. The connecting part 118 is the part of the bushing 101 that transmits a torque by being connected with other portion (a hub in this embodiment) that is to rotate therewith. The connecting part 118 is connected with a hole formed between the external teeth of the hub or at the hub to be relatively non-rotatable. In other words, the connecting part 118 and the hub are connected, so as to be able to transmit a torque therebetween, as described in the previous embodiment.

In this embodiment, since the connecting part 118 is made of metal, the connecting part 118 is abraded less often compared with the conventional one. As mentioned above, the connecting part 118 that is connected with other portion is made of a metal material using resin and metal, resulting in less abrasion compared with the conventional one. As the result, a gap between the connecting part and other portion is caused less often by abrasion, resulting in keeping a torsion characteristic accurate.

In particular, in this embodiment using resin a portion with a complicated shape and a lightweight can be made by the simple method. Combination of the resin portion and the connecting portion 103 made of metal gives an excellent performance as a whole while keeping an advantage of resin.

Alternatively, the connecting portion 103 may be made of a material other than metal, which is more resistant against abrasion than the annular portion 102 that is made of resin. In particular, another resin material, which is more resistant against abrasion than resin of the annular portion 102 can also be used as the material for the connecting portion 103. The connecting portion 103 can also be made of non-metallic and non-resin material such as wood, paper and ceramics.

The term "connecting" as used herein means a relation of two portions between in which a force is transmitted. Thus, the term "connecting" as used herein includes two parts that are frictional touching each other. The connecting part 118 of the connecting portion 103 may be connected with other portions in a rotary direction or in an axial direction. In that case, the abrasion resistance of the part which contacts or rubs against the other portion is improved, resulting in an excellent effect.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bushing arranged to transmit a torque between a pair of torque transmitting members, said bushing comprising:
   an annular resin portion including at least one spring receptacle with contacting portions to seat a spring of one of the torque transmitting members therein; and
   a connecting portion molded in said annular resin portion to be integral therewith, said connecting portion connectable with the pair of torque transmitting members, said connecting portion being more resistant against abrasion than said annular resin portion, said connecting portion including a connecting part and a supporting part, said connecting part including at least one protrusion extending axially from said annular resin portion to connect said connecting portion to one of the torque transmitting members, and said supporting part having L-shaped flanges extending axially into said annular resin portion from said connecting part to transmit torque to both ends of a spring in said spring receptacle.

2. A bushing as set forth in claim 1, wherein
said connecting portion includes an annular part, said annular part is molded in said annular resin portion, and said supporting part extends from said annular part and is disposed at both circumferential ends of said spring receptacle for contacting the spring of one of the torque transmitting members.

3. A bushing as set forth in claim 2, wherein
said annular resin portion has a friction surface to generate a hysteresis torque by relative rotation.

4. A bushing as set forth in claim 2, wherein
said annular resin portion has a plurality of said spring receptacles arranged to seat a plurality of springs of one of the torque transmitting members therein, and
said connecting portion has a plurality of supporting parts extending from said annular part, said supporting parts being disposed at both circumferential ends of said spring receptacles for contacting the springs of one of the torque transmitting members.

5. A bushing as set forth in claim 1, wherein
said annular resin portion has a friction surface to generate a hysteresis torque by relative rotation.

6. A bushing as set forth in claim 1, wherein
said annular portion includes at least two spring receptacles; and
said connecting portion includes at least two supporting parts disposed between said spring receptacles and extending in a circumferential direction.

7. A bushing as set forth in claim 1, wherein
said L-shaped flanges have an exposed end on one of said contacting portions.

8. A bushing arranged to transmit a torque between first and second torque transmitting members, said bushing comprising:
   an annular resin portion having at least one spring receptacle to seat a spring therein; and
   a connecting portion constructed of a material more resistant against abrasion than said annular resin portion, said connecting portion to rotate unitarily with the first torque transmitting member and to couple elastically to the second torque transmitting member via the spring in a rotary direction, said connecting portion including
      an annular part molded in said annular resin portion to be integrally coupled therewith,
      a connecting part including a protrusion extending axially from said annular part to connect with the first torque transmitting member to rotate unitarily with the first torque transmitting member, and
      a supporting part extending from said annular part and disposed at both circumferential ends of said spring receptacle to contact ends of the spring for elastically coupling the second torque transmitting member via the spring in a rotary direction.

9. A bushing as set forth in claim 8, wherein
said annular resin portion has a friction surface to generate a hysteresis torque by relative rotation.

10. A bushing as set forth in claim 8, wherein
said annular resin portion has a plurality of said spring receptacles arranged to seat a plurality of springs of one of the torque transmitting members therein, and
said connecting portion has a plurality of supporting parts extending from said annular part, said supporting parts being disposed at both circumferential ends of said spring receptacles for contacting the springs of one of the torque transmitting members.

11. A bushing as set forth in claim 10, wherein
said annular resin portion has a friction surface to generate a hysteresis torque by relative rotation.

12. A dampening disk assembly for use in a clutch, comprising:
   first and second input plates;

an intermediate plate disposed between said first and second input plates;

a first elastic member coupling said first and second input plates and said intermediate plate elastically in a rotary direction;

an output hub disposed on an inner circumferential side of said first and second input plates and said intermediate plate; and a dampening mechanism located between said output hub and said intermediate plate, said dampening mechanism including a fixing member coupled to said intermediate plate to rotate together with said intermediate plate, and a bushing member having an annular resin portion and a connecting portion made of a more resistant against abrasion material than said annular resin portion, said annular resin portion having at least one spring receptacle with contacting portions to seat a spring extending in a rotary direction of one of said output hub and said fixing member therein said connecting portion including an annular part and a connecting part, said annular part being molded in said annular resin portion to be integral therewith and operatively coupled by at least one protrusion of said connecting part extending axially from said annular resin portion to at least one of said output hub and said fixing member.

13. A dampening disk assembly as set forth in claim 12, wherein said annular resin portion has a friction surface to generate a hysteresis torque by relative rotation against a friction surface of said fixing member, and said dampening mechanism includes an urging member arranged to urge said annular resin portion and said fixing member in an axial direction.

14. A dampening disk assembly as set forth in claim 12, wherein said connecting portion includes a supporting part, said supporting part extends from said annular part and is disposed at both circumferential ends of said spring receptacle for contacting the spring of one of the said output hub and said fixing member.

15. A dampening disk assembly as set forth in claim 14, wherein said connecting part is operatively coupled to said output hub.

16. A dampening disk assembly as set forth in claim 15, wherein said annular resin portion has a friction surface to generate a hysteresis torque by relative rotation against a friction surface of said fixing member, and said dampening mechanism includes an urging member arranged to urge said annular resin portion and said fixing member in an axial direction.

17. A dampening disk assembly as set forth in claim 14, wherein said annular resin portion has a friction surface to generate a hysteresis torque by relative rotation against a friction surface of said fixing member, and said dampening mechanism includes an urging member arranged to urge said annular resin portion and said fixing member in an axial direction.

18. A dampening disk assembly as set forth in claim 12, wherein said output hub has a set of first teeth; and said intermediate plate has a set of second teeth that operatively engage said first teeth after a predetermined amount of relative rotation between said output hub and said intermediate plate.

19. A dampening disk assembly as set forth in claim 18, wherein said connecting portion of said bushing has an annular part located around said output hub and at least one connecting part extending from said annular part into gaps formed between said first teeth of said output hub.

* * * * *